United States Patent Office 3,563,981
Patented Feb. 16, 1971

3,563,981
ALKYLIDENE AROMATIC-AMINOMETHYLENE-
MALONATES AND THEIR PREPARATION
George Y. Lesher, Schodack, N.Y., assignor to Sterling
Drug Inc., New York, N.Y., a corporation of Delaware
No Drawing. Continuation-in-part of application Ser. No.
640,359, May 22, 1967, which is a continuation-in-part
of application Ser. No. 464,850, June 17, 1965. This
application June 10, 1968, Ser. No. 735,567
Int. Cl. C07d 33/20
U.S. Cl. 260—240.3           34 Claims

ABSTRACT OF THE DISCLOSURE

Alkylidene Ar-aminomethylenemalonates, where Ar is an aromatic radical having one or two aromatic rings which can be benzenoid or five- or six-membered heteroaromatic, are prepared by reacting the appropriate aromatic-amine with a mixture of a trialkyl orthoformate or trialkyl orthoacetate and an alkylidene malonate. The alkylidene Ar-aminomethylenemalonates are then cyclized by heating to provide an improved process for preparing various heterocyclic compounds, e.g., a 4-hydroxyquinoline from an alkylidene anilinomethylenemalonate, a 4H-pyrido[1,2-a]pyrimidin-4-one from an alkylidene 2-pyridylaminomethylenemalonate, a 4H-pyrimido[1,2-a]pyrimidine-4-one from an alkylidene 2-pyrimidylaminomethylenemalonate. The cyclized products are useful as intermediates for the preparation of antimalarials and antiinflammatory agents.

This invention relates to aromatic amine derivatives, to a process for their preparation, to processes utilizing said derivatives as intermediates, and to certain products produced by said processes.

This application is a continuation-in-part of my copending application Ser. No. 640,359, filed May 22, 1967 and now abandoned, which in turn is a continuation-in-part of my copending application Ser. No. 464,850, filed June 17, 1965 and now abandoned.

The invention sought to be patented, in one composition aspect, resides in the class of chemical compounds which I depict as having a molecular structure of the Formula I

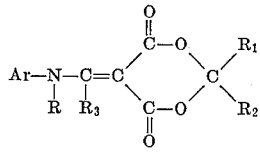

where Ar is 1–2 ringed aryl, R is hydrogen or lower-alkyl $R_1$ and $R_2$ are each lower-alkyl, and, $R_3$ is hydrogen or methyl.

The term "1–2 ringed aryl," as used throughout this specification, e.g., designated as Ar in Formula I, means aromatic radicals having one or two aromatic rings which can be benzenoid or five- or six-membered heteroaromatic, among which are, for purposes of illustration but without limiting the generality of the foregoing, phenyl, naphthyl, biphenylyl, pyridyl, pyrimidyl, pyrazinyl, pyridazinyl, thiazolyl, tetrazolyl, pyrazolyl, quinolyl and coumarinyl radicals. Preferred embodiments, because of their commercial practicability due to availability of intermediates and because of their use in a hereinbelow-described new process to prepare 4-hydroxyquinolines, are the compounds of Formula I where R is hydrogen and Ar is phenyl. Here and elsewhere throughout this specification, it will be understood that the benzene ring of phenyl can bear any kind and number of substituents such as would occur to the man skilled in organic chemistry, e.g., such substituents, solely for illustration and without limiting the generality of the foregoing, including lower-alkyl, lower-alkoxy, lower-alkylmercapto, lower-alkylsulfinyl, lower-alkylsulfonyl, halo, trihalomethyl, nitro, amino, lower-alkylamino, lower-alkanoylamino, benzyloxy, hydroxy, benzyl, and the like. When the benzene ring of phenyl is substituted, there are preferably from one to three substituents which can be in any of the available positions of the benzene ring, and where more than one substituent is present, they can be the same or different and they can be in any of the various position combinations relative to each other. The term "halo," as used here and throughout the specification, includes chloro, bromo, iodo and fluoro. The terms "lower-alkyl," "lower-alkoxy," "lower-alkylmercapto," "lower-alkylsulfinyl," "lower-alkylsulfonyl," "lower-alkylamino," "lower-alkanoylamino," and the like substituents, as used here and throughout the specification, have preferably from one to six carbon atoms which can be arranged as straight or branched chains, and, without limiting the generality of the foregoing, are illustrated by methyl, ethyl, n-propyl, isobutyl, n-hexyl, methoxy, isobutoxy, ethylmercapto, n-amylmercapto, ethylsulfinyl, isobutylsulfinyl, isopropylsulfonyl, n-butylsulfonyl, ethylamino, n-butylamino, acetylamino and propionylamino.

Other 1–2 ringed aryl radicals, e.g., naphthyl, biphenylyl, pyridyl, pyrimidyl, pyrazinyl, pyridazinyl, thiazolyl, tetrazolyl, pyrazolyl, coumarinyl and quinolyl radicals, also can bear at available ring-carbon positions substituents such as those illustrated above as substituents of the benzene ring.

The term "lower-alkyl," as used throughout this specification, e.g., as the meaning for each of $R_1$ and $R_2$ in Formula I, means alkyl radicals having from one to six carbon atoms inclusive, as illustrated by methyl, ethyl, n-propyl, isopropyl, 2-butyl, isobutyl, n-butyl, n-amyl, n-hexyl, and the like. Preferred embodiments, because of their cost advantage, are the compounds of Formula I where $R_1$ and $R_2$ are each methyl.

One process aspect of the invention resides in the preparation of the compounds of Formula I by reacting the appropriate aromatic-amine of the formula Ar—NHR with a mixture of trialkyl orthoformate or trialkyl orthoacetate and an alkylidene malonate. This process is discussed hereinbelow and specifically illustrated as the first step of another process aspect of the invention, namely, the preparation of 4-hydroxyquinolines utilizing the com-compounds of Formula I where R is hydrogen and Ar is phenyl, as defined above.

4-hydroxyquinolines are valuable intermediates. For example, they have been converted to corresponding 4-haloquinolines which, in turn, have been reacted with certain alkylenediamines to synthesize compounds having valuable chemotherapeutic properties, e.g., reaction of 4,7-dichloroquinoline with 5-diethylamino-2-pentylamine yields 7-chloro-4-(5-diethylamino-2-pentylamino)quinoline, an antimalarial agent known as chloroquine.

Heretofore, the preferred method of preparing 4-hydroxyquinolines has been the four-step Gould-Jacobs' synthesis illustrated as follows using aniline (II) as an intermediate:

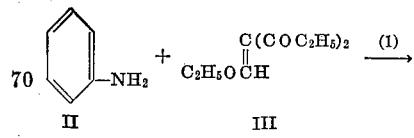

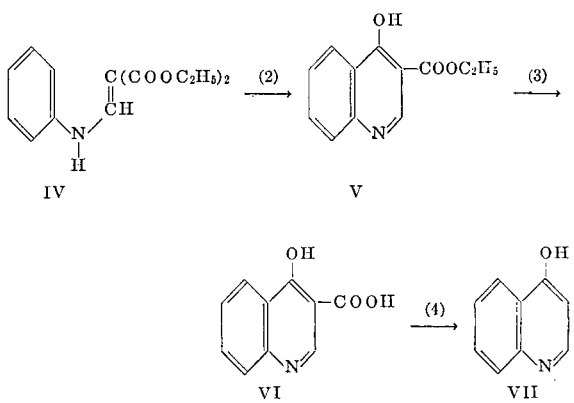

Thus, in step (1), aniline (II) is reacted with diethyl ethoxymethylenemalonate (III) to form diethyl anilinomethylenemalonate (IV), which is cyclized by heating in step (2) to form ethyl 4-hydroxyquinoline-3-carboxylate (V). In step (3), the ester (V) is hydrolyzed to the acid (VI) which is then decarboxylated in step (4) to produce 4-hydroxyquinoline (VII).

In contrast to the above four-step procedure, the process of my invention resides in only two steps, which are illustrated below using aniline (II) as an intermediate. As seen in the following illustration, no ester and no acid corresponding respectively to V and VI above are formed in my process.

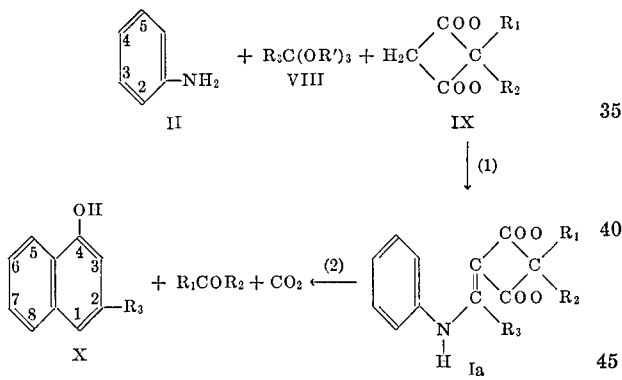

where $R_3$ is hydrogen or methyl, and $R'$, $R_1$ and $R_2$ are each lower-alkyl. The aniline used in my process is unsubstituted in at least one of benzene ring positions ortho to the amino group. Optionally, the aniline can be substituted by from one to four of a variety of substituents at positions 2, 3, 4 or 5 of the benzene ring thereby resulting in 4-hydroxyquinolines similarly substituted at positions 8, 7, 6 or 5, respectively; unsymmetrical anilines, e.g., those monosubstituted in the meta- or 3-position and having no substituents at either the 2- or 6-position, yield a mixture of isomeric 4-hydroxyquinolines (X), e.g., use of 3-chloroaniline results in a mixture of 5-chloro-4-hydroxyquinoline and 7-chloro-4-hydroxyquinoline which can be separated by known means.

In step (1) of my two-step process, an aniline (e.g., II) is reacted with a mixture of a trialkyl orthoformate (VIII, $R_3$=H) or orthoacetate (VIII, $R_3$=CH$_3$) and an alkylidene malonate (IX) to yield an alkylidene anilinomethylenemalonate (e.g., Ia) which, in step (2), is heated to form the 4-hydroxyquinoline (e.g., X) and a ketone, $R_1COR_2$, and carbon dioxide. Step (1) is preferably carried out by warming to about 50–100° C., with stirring, a mixture of the three reactants, preferred reactants being triethyl orthoformate (VIII, $R_3$=H and $R'$=C$_2$H$_5$) and isopropylidene malonate (IX, $R_1$=R$_2$=CH$_3$). The reaction also can be run by stirring the reactants at room temperature although the reaction may take longer or, also, it can be run at temperatures higher than 100° C., although to no particular advantage. Many of the illustrative examples hereinbelow were carried out in the presence of a small quantity of p-toluenesulfonic acid since it was first thought that the reaction was acid catalyzed, but it was later found out that the condensation could be effected in the absence of an acid, in fact, even in the presence of excess sodium acetate. Actually, the reaction is preferably run with no condensing agent. Yields are very good, ranging from about 70 to 95%. Step (2) of my process, i.e., the ring closure of the alkylidene anilinomethylenemalonate (e.g., Ia) to form the 4-hydroxyquinoline (e.g., X), was carried out by heating the isopropylidene anilinomethylenemalonate in an inert solvent at about 200 to 300° C., preferably at about 225–275° C. Found particularly useful was a refluxing eutectic mixture of diphenyl and diphenyl ether (Dowtherm® A). Other solvents that can be used are mineral oil, dibenzyl ether, diethyl phthalate, nitrobenzene, and the like. Optionally, the reaction can be run by heating as above in the absence of a solvent. Yields of this step usually range from about 50 to 100%.

Alternatively, the above two steps of my process have been run consecutively without isolation of compound Ia, the yields being comparable with those obtained by isolating said intermediate.

Another variation of my process is the one-step reaction of the reactants of step (1) above using the reaction conditions of step (2) to form the 4-hydroxyquinolines. This variation, which also affords a way of preparing 4-hydroxyquinolines optionally bearing a 3-(lower-alkyl) substituent ($R_4$), is illustrated as follows using aniline (II):

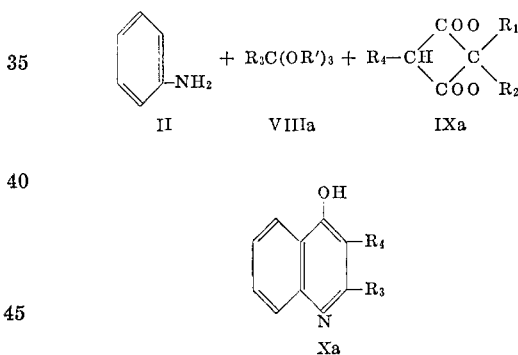

where $R_3$ is hydrogen or methyl, $R_4$ is hydrogen or lower-alkyl, and $R'$, $R_1$ and $R_2$ are each lower-alkyl. As above, the aniline used in the process is unsubstituted in at least one of the benzene ring positions ortho to the amino group and, optionally, can be substituted as noted hereinabove. In the above one-step synthesis, a mixture of an aniline (e.g., II), a trialkyl orthoformate (VIIIa, $R_3$=H) or orthoacetate (VIIIa, $R_3$=CH$_3$), and an alkylidene lower-alkyl)-malonate (IXa) is heated as in step (2) above to form the 4-hydroxyquinoline (e.g., Xa) and a ketone, $R_1COR_2$ and carbon dioxide.

In the above step (1) of my process, when another lower-aromatic amine (Ar—NH$_2$) is substituted for an aniline, the corresponding alkylidene (lower-aromatic)-aminomethylenemalonate of Formula I is obtained. When such a compound is treated as in step (2), ring closure is effected to produce a product containing a newly formed six-atom aromatic ring containing hydroxyl or oxo substituted in the position para to the ring-nitrogen atom. Thus, by heating a compound of Formula I where R is hydrogen, $R_1$ and $R_2$ are each lower-alkyl, $R_3$ is hydrogen or methyl, and Ar is 1–2 ringed aryl which has a substitutable ring-carbon ortho to its ring-carbon connected to the nitrogen atom of the aminomethylenemalonate moiety, there is formed a (4-hydroxy-2-$R_3$-5,6-pyrido)-Ar compound; or, by heating a compound of Formula I where R is hydrogen, $R_1$ and $R_2$ are each lower-alkyl, $R_3$ is hydrogen or methyl, and Ar is 1–2 ringed aryl which has a ring-nitrogen atom adjacent to its ring-carbon connected to the nitrogen atom of the aminomethylenemalonate moiety, ring closure is effected at the ring-nitrogen atom to form a (4-oxo-6-$R_3$-2,3-pyrimido)-Ar compound. These ring closures thus are other process aspects of my invention and, without limiting the generality of the foregoing, are illustrated as follows: heating an alkylidene naphthylaminomethylenemalonate to form a 4-hydroxybenzoquinoline; heating an alkylidene 2-pyridylaminomethylenemalonate to form a 4H-pyrido[1,2-a]pyrimidin-4-one; heating an alkylidene 2-substituted-3-pyridylaminomethylenemalonate to form a 4-hydroxy-8-substituted-1,7-naphthyridine; heating an alkylidene 2-unsubstituted-3-pyridylaminomethylenemalonate to form a 4-hydroxy-1,5-naphthyridine; heating an alkylidene 2-pyrimidylaminomethylenemalonate to form a 4H-pyrimido[1,2-a]pyrimidin-4-one; heating an alkylidene 5-uracilylaminomethylenemalonate to form a 1,5-dihydro-3H-pyrido[3,2-d]pyrimidine-2,4,8-trione; heating an alkylidene 2-pyrazinylaminomethylenemalonate to form a 4H-pyrazino[1,2-a]pyrimidin-4-one; heating an alkylidene 3-pyridazinylaminomethylenemalonate to form a 4H-pyrimido[1,2-b]pyridazin-4-one; heating an alkylidene 2-thiazolylaminomethylenemalonate to form a pyrimido[2,1-b]thiazole; heating an alkylidene 5-(1H-tetrazolyl)-aminomethylenemalonate to form a 7-hydroxytetrazolo[1,5-a]pyrimidine; heating an alkylidene 2-phenyl (or lower-alkyl)-3-pyrazolylaminomethylenemalonate to form a 1-phenyl (or lower-alkyl)-1H-pyrazolo[3,4-b]pyridine; heating an alkylidene 2-quinolylaminomethylenemalonate to form a 1H-pyrimido[1,2-a]quinolin-1-one; heating an alkylidene 3-quinolylaminomethylenemalonate to form a benzo[f][1,7]naphthyridin-1-ol; heating an alkylidene 5-quinolylaminomethylenemalonate to form a 1,7-phenanthrolin-4-ol; heating an alkylidene 6-quinolylaminomethylenemalonate to form a 4,7-phenanthrolin-1-ol; heating an alkylidene 7-quinolylaminomethylenemalonate to form a 1,7-phenanthrolin-10-ol; heating an alkylidene 8-quinolylaminomethylenemalonate to form a 1,10-phenanthrolin-4-ol; and, heating an alkylidene 6-coumarinylaminomethylenemalonate to form a 10-hydroxy-3-oxo-3H-pyrano[3,2-f]quinoline.

The (hydroxy-2-$R_3$-5,6-pyrido)-Ar and (4-oxo-6-$R_3$-2,3-pyrimido)-Ar products of my process are useful, for example, the former are useful as intermediates in the preparation of antimalarial agents, as illustrated above for the 4-hydroxyquinolines, and the latter have anti-inflammatory activity, as illustrated below for the 4H-pyrido[1,2-a]pyrimidin-4-ones.

It will be noticed that Ar in Formula I includes substituents which by their location may inhibit or even prevent the cyclization process to form the (4-hydroxy-2-$R_3$-5,6-pyrido)-Ar or (4-oxo-6-$R_3$-2,3-pyrimido)-Ar compound, e.g., the failure to cyclize isopropylidene 2,6-dimethylanilinomethylenemalonate (by the blocking action of the 2- and 6-methyl substituents). Nevertheless, such compounds as these are useful in establishing the limits of the cyclization reaction.

Also, it will be noticed that the compounds of Formula I where R is lower-alkyl do not undergo cyclization, e.g., the failure to cyclize isopropylidene N-methylanilinomethylenemalonate (by the apparent blocking action of the N-methyl substituent). Such compounds are, nevertheless, useful in establishing the limits of the cyclization reaction. Further, these N-(lower-alkyl) compounds have been tested by standard pharmacological evaluation procedures and found to be useful in having biological activity, e.g., psychomotor depressant properties, barbiturate-potentiating activity, as illustrated further hereinbelow.

Another composition aspect of my invention sought to be patented is described as residing in the class of chemical compounds which I designate 4H-pyrido[1,2-a]pyrimidin-4-ones of the Formula XI:

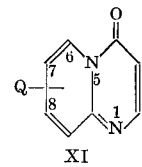

XI where Q represents from one to three substituents at positions 6, 7, 8 or 9 of the pyridopyrimidine nucleus selected from the group consisting of lower-alkyl, hydroxy-lower-alkanoylamino, lower-alkylamino, benzyl, lower-alkoxy, lower-alkylmercapto, lower-alkylsulfinyl, lower-alkylsulfonyl and trihalomethyl. These embodiments of my invention are useful because of their anti-inflammatory properties as established by known pharmacological test procedures, e.g., inhbition of carrageenin-induced local foot edema in fasted rats. For example, when tested by the above-noted procedure, these compounds when administered orally at dose levels in the range of 25 to 200 mg./kg. were found to afford greater than 30% inhibition of edema, thereby evidencing their anti-inflammatory activity. In contrast, the corresponding unsubstituted compound, i.e., Formula XI where Q is hydrogen, when tested by the same procedure, produced insignificant inhibition at 200 mg./kg.

The compounds of Formula XI were prepared by my above-described process, that is, by heating a Q-2-pyridylaminomethylenemalonate (Ib) to form a Q-4H-pyrido[1,2-a]pyrimidin-4-one (XI), illustrated structurally as follows:

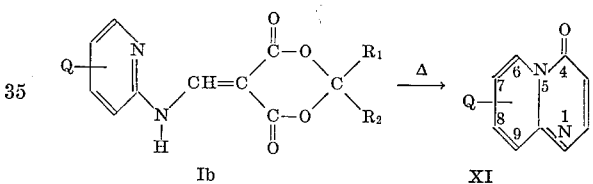

Ib          XI

The compounds of Formula XI are useful both in free base form and in acid-addition salt form and both forms are within the purview of the invention, and are considered to be one and the same invention. The acid-addition salts are simply a usually more convenient form for use; and, in practice, use of the salt form inherently amounts to use of the base form. The acids which can be used to prepare the acid-addition salts are preferably those which produce, when combined with the free base, pharmacodynamically acceptable salts, that is, salts whose anions are relatively innocuous to the animal organism in pharmacodynamic doses of the salts, so that the beneficial properties inherent in the free base are not vitiated by side effects ascribable to the anions; in other words, the latter do not substantially affect the pharmacodynamic properties inherent in the cations. Appropriate pharmacodynamically acceptable salts within the scope of the invention are those derived from mineral acids such as hydrochloric acid, hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrochloride, hydrobromide, hydriodide, nitrate, phosphate, sulfamate sulfate, acetate, citrate, tartrate, lactate, methanesulfonate, ethanesulfonate and quinate, respectively.

The acid-addition salts are prepared preferably by reacting the free base and acid in an organic solvent, e.g., ethanol, in which case the salt separates directly or can be obtained by concentration of the solution.

Although pharmacodynamically acceptable salts are preferred, all acid-addition salts are within the scope of my invention. All acid-addition salts are useful as sources of the free base form even if the particular salt per se is not desired as the final product, as for example when the salt is formed for purposes of purification or identification, or when it is used as an intermediate in preparing a pharmacodynamically acceptable salt by ion exchange procedures.

Also encompassed by my invention are quaternary ammonium salts of the aforesaid 4H-pyrido[1,2-a]pyrimidin-4-ones of the Formula XI, quaternization occurring at the 1-ring nitrogen. These salts are also useful because of their anti-inflammatory properties and are useful for further identification of said 4H-pyrido[1,2-a]pyrimidin-4-ones. The quaternary ammonium salts are obtained by the addition of esters having a molecular weight less than about 200 to the free base form of the compounds. A preferred class of esters comprises lower-alkyl, lower-alkenyl or benzyl esters of inorganic acids of organic sulfonic acids of the Formula $R_5$—An where $R_5$ is lower-alkyl, lower-alkenyl (having 3 to 6 carbon atoms) or benzyl and An is an anion of a strong inorganic acid or an organic sulfonic acid, e.g., chloride, bromide, iodide, sulfate, methanesulfonate, benzenesulfonate, para-toluenesulfonate, and the like. $R_5$ when benzyl can bear any number and kind of inert substituents in the benzene ring, such substituents being illustrated by, but not limited to, lower-alkyl, lower-alkoxy, halo, nitro, lower-alkylamino, lower-alkylmercapto, and the like. $R_5$—An is thus illustrated by, but not limited to, methyl chloride, methyl bromide, methyl iodide, ethyl bromide, propyl chloride, isobutyl bromide, allyl chloride, allyl bromide, methyl sulfate, methyl methanesulfonate, methyl benzenesulfonate, methyl p-toluenesulfonate, benzyl chloride, benzyl bromide, p-chlorobenzyl chloride, p-nitrobenzyl chloride, o-chlorobenzyl chloride, 3,4-dichlorobenzyl chloride, p-methoxybenzyl chloride, and the like. The quaternary ammonium salts are prepared by mixing the free base and the alkyl, alkenyl or benzyl esters in an organic solvent inert under the conditions of reaction, for example, ethanol, methanol, ether, acetonitrile, dimethylformamide, dimethyl sulfoxide, and the like, or alternatively, in the absence of a solvent. Heating is preferably used to facilitate the reaction, although quaternary formation takes place at room temperature but a longer reaction time is needed. The quaternary ammonium salt separates directly or can be obtained by concentration of the solution.

Also encompassed by my invention are the 1-oxide derivatives of the alkylidene pyridylamino-methylenemalonates of Formula Ib. These compounds, which are prepared by the first step of my above-described process by reacting a 2-aminopyridine-N-oxide with a tri-(lower-alkyl) orthoformate and an alkylidene malonate, are useful as characterizing derivatives of the compounds of Formula Ib.

Other aspects encompassed by my invention are: the bis-analogs of the compounds of Formula I, i.e., the compounds of the Formula XII:

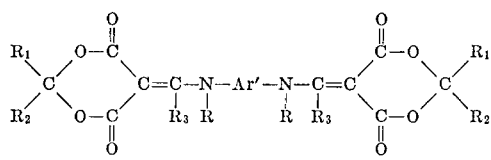

XII where Ar' phenylene or as defined hereinbelow (i.e., Ar"—Z—Ar") and, R, $R_1$, $R_2$ and $R_3$ are each defined as above for Formula I; the process of preparing the bis compounds of Formula XII which is carried out the same as the hereinabove-described process of preparing the compounds of Formula I but using an arylenediamine of the formula $H_2N$—Ar'—$NH_2$ and at least two molar equivalents of other reactants, i.e., a mixture of a trialkyl orthoformate or trialkyl orthoacetate and an alkylidene malonate; and, the process of heating a compound of Formula XII as described hereinabove (for the process of heating a compound of Formula I) to form the corresponding bis(4-hydroxy-2-$R_3$-5,6-pyrido)=Ar' compound when Ar' is phenylene which is unsubstituted at ring-carbon positions ortho to its ring-carbons connected to the nitrogen atoms of the aminomethylene-malonate moieties. Other bis-aspects of my invention are like the above where —Ar'— is replaced by —Ar"—Z—Ar"— where Ar" is phenylene and Z is a direct linkage, O, S, S—S, NH, N(lower-alkyl), C(=O) or lower-alkylene. Here and elsewhere throughout this specification, it will be understood that the benzene ring of phenylene, designated above as Ar' and Ar", can bear any kind and number of substituents such as would occur to the man skilled in organic chemistry, e.g., such substituents being the same as those illustrated above for the benzene ring of phenyl.

The molecular structures of the compounds of my invention are established by their mode of synthesis and corroborated by the correspondence of calculated and found values for the elementary analyses and by infrared (IR) spectral analyses.

The following examples will further illustrate the invention without, however, limiting it thereto.

EXAMPLE 1

(A) Isopropylidene 4-methoxyanilinomethylene-malonate—A mixture containing 12.3 g. of 4-methoxy-aniline, 14.8 g. of ethyl orthoformate, 15.8 g. of isopropylidene malonate and 1.0 g. of p-toluenesulfonic acid monohydrate was stirred at room temperature for one hour and then heated for ten minutes on a steam bath to boil off the ethanol formed by the reaction. The solid that remained was recrystallized from 500 cc. of 95% ethanol using decolorizing charcoal to yield 15 g. (54%) of the product, isopropylidene 4-methoxy-anilinomethylenemalonate, M.P. 163–164.5° C. A 5.0 g. sample was recrystallized again from ethanol and dried in a vacuum oven at 60° C. to yield 4.2 g. of the white microcrystalline product, M.P. 163.2–166.8° C. (corr.).

Analysis.—Calcd. for $C_{14}H_{15}NO_5$ (percent): C, 60.64; H, 5.45; N, 5.05. Found (percent): C, 60.84; H, 5.46; N, 4.97.

(B) 4-hydroxy-6-methoxyquinoline was prepared from isopropylidene 4-methoxyanilinomethylenemalonate as follows: To 100 ml. of Dowtherm A heated to 245° C. was added, with stirring, 10.0 g. of isopropylidene 4-methoxyanilinomethylenemalonate whereupon a vigorous reaction occurred and the acetone formed by the reaction was boiled from the reaction mixture. Heating was continued for an additional five minutes after which time no more acetone boiled off. The reaction mixture was allowed to cool to room temperature with continued stirring and the solid that separated was collected, washed with n-pentane, air-dried and recrystallized from water to yield 2.9 g. of 4-hydroxy-6-methoxy-quinoline, M.P. 245–247° C.

Analysis.—Calcd. for $C_{10}H_9NO_2$ (percent): C, 68.56; H, 5.18; N, 8.00. Found (percent): C, 68.86; H, 4.99; N, 8.01, 7.65.

The same product, 4-hydroxy-6-methoxyquinoline, is obtained by heating isopropylidene 4-methoxyanilinomethylenemalonate at 245° C. in the absence of a solvent.

EXAMPLE 2

(A) Isopropylidene 4-methylanilinomethylene-malonate was prepared following the procedure described in Example 1A using 10.7 g. of p-toluidine, 14.8 g. of ethyl orthoformate, 15.8 g. of isopropylidene malonate and 1.0 g. of p-toluenesulfonic acid monohydrate. There was thus obtained 17.5 g. (67%) of the product, isopropylidene 4-methylanilinomethylenemalonate, M.P. 151–152.5° C. Recrystallization of a 5.0 g. sample from ethanol a second time yielded 4.7 g. of the product, M.P. 150.0–151.2° C. (corr.).

Analysis.—Calcd. for $C_{14}$–$H_{15}NO_4$ (percent): C, 64.36; H, 5.79; N, 5.36. Found (percent): C, 64.28; H, 6.06; N, 5.32.

(B) Following the procedure described in Example 1B, isopropylidene 4-methylanilinomethylene-malonate (12.5 g.) was heated in Dowtherm A (125 ml.) to yield 4.1 g. of 4-hydroxy-6-methylquinoline. A sample recrystallized from water and dried in a vacuum oven at 60° C. melted at 237–239° C.

Analysis.—Calcd. for $C_{10}H_9NO$ (percent): C, 75.45; H, 5.70; N, 8.80. Found (percent): C, 75.71; H, 5.59; N, 8.60, 8.70.

EXAMPLE 3

(A) Isopropylidene anilinomethylenemalonate was prepared following the procedure described in Example 1A using 9.3 g. of aniline, 14.8 g. of ethyl orthoformate, 15.8 g. of isopropylidene malonate and 1.0 g. of p-toluenesulfonic acid monohydrate. There was thus obtained 19.5 g. (79%) of the product, isopropylidene anilinomethylenemalonate, M.P. 154.0–155.8° C. (corr.).

Analysis.—Calcd. for $C_{13}H_{13}NO_4$ (percent): C, 63.15; H, 5.30; N, 5.67. Found (percent): C, 63.44; H, 5.16; N, 5.35.

(B) Ring closure of isopropylidene anilinomethylenemalonate (2.5 g.) in Dowtherm A (25 ml.) as in Example 1B yielded 1.0 g. (69%) of 4-hydroxyquinoline, M.P. 192–198° C.

EXAMPLE 4

(A) Isopropylidene 4-nitroanilinomethylene-malonate was prepared following the procedure described in Example 1A using 13.8 g. of p-nitroaniline, 14.8 g. of ethyl orthoformate, 15.8 g. of isopropylidene malonate and 1.0 g. of p-toluenesulfonic acid monohydrate. There was thus obtained 19.5 g. (67%) of isopropylidene 4-nitroanilinomethylenemalonate after one recrystallization from acetonitrile. A 4.0 g. sample was recrystallized a second time from acetonitrile to yield 3.7 g. of the product, M.P. 215.0–216.0° C. (corr.) with decomposition.

Analysis.—Calcd. for $C_{13}H_{12}N_2O_6P$ (percent): C, 53.43; H, 4.14; N, 9.59. Found (percent): C, 53.62; H, 4.07; N, 9.63.

(B) Refluxing 2.9 g. of isopropylidene 4-nitroanilinomethylenemalonate in 58 ml. of Dowtherm A as in Example 1B yielded 1.7 g. (90%) of 4-hydroxy-6-nitroquinoline, M.P. 338°–339° C., with decomposition.

(C) 4-hydroxy-6-nitroquinoline was also obtained by heating a small sample of isopropylidene 4-nitroanilinomethylenemalonate in refluxing nitrobenzene for about four minutes, allowing the reaction mixture to cool to room temperature, and collecting the product by filtration.

EXAMPLE 5

(A) Isopropylidene 4-chloroanilinomethylenemalonate was prepared following the procedure described in Example 1A using 12.8 g. of p-chloroaniline, 14.8 g. of ethyl orthoformate, 15.8 g. of isopropylidene malonate and 1.0 g. of p-toluenesulfonic acid monohydrate. After one recrystallization from ethanol, there was obtained 23.5 g. (84%) of isopropylidene 4-chloroanilinomethylenemalonate, M.P. 209.0–209.4° C. (corr.), with decomposition.

Analysis.—Calcd. for $C_{13}H_{12}ClNO_4$ (percent): C, 55.43; H, 4.29; N, 4.98. Found (percent): C, 55.18; H, 4.07; N, 4.84.

(B) 6-chloro-4-hydroxyquinoline (0.8 g., 44%) was obtained following the procedure described in Example 1B using 2.8 g. of isopropylidene 4-chloroanilinomethylenemalonate and 30 ml. of Dowtherm A.

(C) 6-chloro-4-hydroxyquinoline was prepared in one step using the reactants of 5A as follows: A mixture containing 2.5 g. of p-chloroaniline, 3.0 g. of ethyl orthoformate, 3.2 g. of isopropylidene malonate and 56 ml. of Dowtherm A was slowly heated to 100° C. with stirring over a period of thirty minutes. Heating of the resulting clear solution was then accelerated. At 120° C., bubbles began to form. After ten minutes the temperature was 251° C. Evolution of bubbles had been very rapid above 200° C. but by 230° C., bubbling had subsided somewhat and the solution began to turn red. The reaction mixture was allowed to cool to room temperature while being stirred. The precipitate was collected, washed well with n-pentane and air-dried to yield 1.5 g. (42%) of 6-chloro-4-hydroxyquinoline, M.P. 251–261° C.

EXAMPLE 6

(A) Isopropylidene 2 - methylanilinomethylenemalonate was prepared following the procedure described in Example 1A using 10.7 g. of o-toluidine, 14.8 g. of ethyl orthoformate, 15.8 g. of isopropylidene malonate and 1.0 g. of p-toluenesulfonic acid monohydrate. There was thus obtained 19.9 g. (76%) of isopropylidene 2-methylanilinomethylenemalonate. A second recrystallization of a 5.0 g. sample from ethanol yielded 4.2 g. of the product, M.P. 120.2–121.8° C. (corr.)

Analysis.—Calcd. for $C_{14}H_{15}NO_4$ (percent): C, 64.36; H, 5.79; N, 5.36. Found (percent): C, 64.26; H, 5.65; N, 5.52.

(B) Refluxing 7.5 g. of isopropylidene 2-methylanilinomethylenemalonate in 75 ml. of Dowtherm A as in Example 1B yielded 3.3 g. (72%) of 4-hydroxy-8-methylquinoline, M.P. 211–215° C.

(C) Refluxing 7.5 g. of isopropylidene 2-methylanilinomethylenemalonate in 37.5 ml. of nitrobenzene as in Example 4C yielded 2.5 g. (54%) of 4-hydroxy-8-methylquinoline, M.P. 213.5–215° C. Recrystallization of this product from water using decolorizing charcoal yielded 1.9 g. of the 4-hydroxy-8-methylquinoline, M.P. 215–216° C.

Analysis.—Calcd. for $C_{10}H_9NO$ (percent): C, 75.45; H, 5.70; N, 8.80. Found (percent): C, 75.53; H, 5.41; N, 8.79.

EXAMPLE 7

(A) Isopropylidene 2-methoxyanilinomethylenemalonate.—A mixture containing 12.3 g. of o-anisidine, 14.8 g. of ethyl orthoformate, 15.8 g. of isopropylidene malonate and 1.0 g. of p-toluenesulfonic acid monohydrate was stirred at room temperature. The reaction mixture warmed spontaneously and after ten minutes crystallized. The crystallized material was collected, recrystallized from ethanol and air-dried to yield 23.1 g. (83%) of isopropylidene 2-methoxyanilinomethylenemalonate, M.P. 153–155° C. Recrystallization of a 5.0 g. sample from ethanol yielded 4.8 g. of the product, M.P. 154.0–155.8° C. (corr.).

Analysis.—Calcd. for $C_{14}H_{15}NO_5$ (percent): C, 60.64; H, 5.45; N, 5.05. Found (percent): C, 60.94; H, 5.33; N, 5.33.

(B) Refluxing 5.5 g. of the above product, isopropylidene 2-methoxyanilinomethylenemalonate, in 55 ml. of Dowtherm A following the procedure described in Example 1B yielded 0.6 g. of 4-hydroxy-8-methoxyquinoline, M.P. 185–186° C.

Analysis.—Calcd. for $C_{10}H_9NO_2$ (percent): C, 68.56; H, 5.18; N, 8.00. Found (percent): C, 68.58; H, 5.06; N, 7.96.

EXAMPLE 8

(A) Isopropylidene 2-nitroanilinomethylenemalonate was prepared following the procedure described in Example 1A using 13.8 g. of o-nitroaniline, 14.8 g. of ethyl orthoformate, 15.8 g. of isopropylidene malonate and 1.0 g. p-toluenesulfonic acid monohydrate. There was thus obtained, after recrystallization from acetonitrile, 14.1 g. (48%) of isopropylidene 2-nitroanilinomethylenemalonate, M.P. 175–177° C. A small sample for analysis was recrystallized a second time from acetonitrile, M.P. 180–181° C. with decomposition.

Analysis.—Calcd. for $C_{13}H_{12}N_2O_6$ (percent): C, 53.43; H, 4.14; N, 9.59. Found (percent): C, 53.29; H, 4.80; N, 9.44.

(B) Isopropylidene 2-nitroanilinomethylenemalonate (5.0 g.) was converted to 4-hydroxy-8-nitroquinoline (0.9 g.), M.P. 207–209° C. by refluxing in nitrobenzene (50 ml.) following the procedure described in Example 4C and recrystallizing from water using decolorizing charcoal.

*Analysis.*—Calcd. for $C_9H_6N_2O_3$ (percent): C, 56.84; H, 3.18; N, 14.73. Foudn (percent): C, 57.10; H, 3.05; N, 14.23.

(C) 4-hydroxy-8-nitroquinoline (3.7 g.) was obtained by refluxing isopropylidene 2-nitroanilinomethylenemalonate (7.0 g.) in Dowtherm A (140 ml.) following the procedure described in Example 1B.

EXAMPLE 9

(A) Isopropylidene 4-methoxy-2-nitroanilinomethylenemalonate.—A mixture containing 33.6 g. of 4-methoxy-2-nitroaniline, 29.6 g. of triethyl orthoformate, 31.7 g. of isopropylidene malonate and 150 ml. of absolute ethanol was heated with stirring on a steam bath for ten minutes. The reaction mixture was then heated in vacuo for an additional fifteen minute to remove the solvent and the ethanol formed by the reaction. The remaining solid was recrystallized from acetonitrile, using decolorizing charcoal, to yield 47.3 g. (73.5%) of isopropylidene 4-methoxy-2-nitroanilinomethylenemalonate, M.P. 203.0–203.6° C. (corr.), with decomposition.

*Analysis.*—Calcd. for $C_{14}H_{14}N_2O_7$ (percent): C, 52.17; H, 4.38; N, 8.69. Found (percent): C, 52.28; H, 4.55; N, 8.75.

(B) Following the procedure described in Example 1B and using 10 g. of isopropylidene 4-methoxy 2-nitroanilinomethylenemalonate and 150 ml. of Dowtherm A, there was obtained 4.9 g. (72%) of 4-hydroxy-6-methoxy-8-nitroquinoline, M.P. 229–230° C. Recrystallization of this compound from ethanol, using decolorizing charcoal, yielded 3.7 g. of the product melting at 228.0–228.6° C. (corr.).

*Analysis.*—Calcd. for $C_{10}H_8N_2O_4$ (percent): C, 54.55; H, 3.66; N, 12.72. Found (percent): C, 54.75; H, 3.81; N, 12.48.

EXAMPLE 10

(A) Isopropylidene 3-nitroanilinomethylenemalonate was prepared following the procedure described in Example 1A using 13.8 g. of 3-nitroaniline, 14.8 g. of ethyl orthoformate, 15.8 g. of isopropylidene malonate, and 1.0 g. of p-toluenesulfonic acid monohydrate. There was thus obtained 22.8 g. (78%) of the product, M.P. 198–201° C. with decomposition after recrystallization from about 1 liter of acetonitrile. Recrystallization of a 5.0 g. sample from acetonitrile gave 4.2 g. of the product, M.P. 197.0–203.8° C. (corr.) with decomposition.

*Analysis.*—Calcd. for $C_{13}H_{12}N_2O_6$ (percent): C, 53.43; H, 4.14; N, 9.59. Found (percent): C, 53.34; H, 4.40; N, 9.75.

(B) To 50 ml. of dibenzyl ether heated to 250° C. was added with rapid stirring 5.0 g. of isopropylidene 3-nitroanilinomethylenemalonate. After evolution of carbon dioxide subsided (about thirty seconds), the mixture was allowed to cool to room temperature with rapid stirring. The resulting precipitate was collected, washed well with dry ether and dried to yield 1.4 g. (43%) of product, M.P. 297–299° C. with decomposition. This product, a mixture of 4-hydroxy-5-nitroquinoline and 4-hydroxy-7-nitroquinoline, was subjected to a thin layer chromatography (TLC) analysis as follows: A sample was placed on a silica gel plate with dimethylformamide and eluted with 80% chloroform:10% acetic acid:10% methanol. After spraying the plate with flourscein dye, two fluorescent spots appeared in addition to the dimethylformamide spot. Amounts roughly estimated by size and density of the spots were 3:1 with the larger spot running ahead (the large spot presumably represents the 7-nitro isomer). The product was then recrystallized from dimethylformamide using decolorizing charcoal to yield 0.3 g. of 4-hydroxy-7-nitroquinoline, M.P. >360° C. with decomposition.

*Analysis.*—Calcd. for $C_9H_6N_2O_3$ (percent): C, 56.84; H, 3.18; N, 14.74. Found (percent): C, 56.77; H, 3.47; N, 14.47.

The above dimethylformamide filtrate was diluted with several volumes of dry ether and the solid that separated was collected, washed with ether and dried to yield 0.4 g. of 4-hydroxy-5-nitroquinoline, M.P. 350° C. with decomposition. A mixed melting point with the 7-nitro isomer was depressed 50°.

*Analysis.*—Calcd. for $C_9H_6N_2O_3$ (percent): C, 56.84; H, 3.18; N. 14.74. Found (percent): C, 56.61; H, 3.26; N, 14.58.

EXAMPLE 11

(A) Isopropylidene 3 - chloroanilinomethylenemalonate.—A mixture containing 12.8 g. of 3-chloroaniline, 15.8 g. of isopropylidene malonate, 14.8 g. of ethyl orthoformate and 1.0 g. of p-toluenesulfonic acid monohydrate was heated slowly. After one hour, the temperature had risen to 80° C. and about 11.4 g. of ethanol had distilled off. The reaction mixture was then heated for an additional thirty minutes whereupon the temperature rose to about 120° C. The resulting crystalline product was recrystallized from about 1000 ml. of absolute ethanol to yield 22.4 g. (80%) of isopropylidene 3-chloroanilinomethylenemalonate, M.P. 167.6–169.0° C.

*Analysis.*—Calcd. for $C_{13}H_{12}ClNO_4$ (percent): N, 4.98; Cl, 12.59. Found (percent): N, 4.81; Cl, 12.45.

(B) Conversion of isopropylidene 3-chloroanilinomethyleneamlonate into a mixture of 5-chloro-4-hydroxyquinoline and 7-chloro-4-hydroxyquinoline and subsequent conversion of these isomers to the corresponding 4, 5(and 7)-dichloroquinolines are given as follows: To 30 ml. of refluxing Dowtherm A was added with stirring 2.8 g. of isopropylidene 3-chloroanilinomethylenemalonate. After an initial vigorous reaction, the mixture was refluxed for ten minutes and cooled to room temperature while stirring. The solid that separated was collected to yield 1.6 g. (89%) of a mixture of 5-chloro-4-hydroxyquinoline and 7-chloro-4-hydroxyquinoline.

A mixture of 1.0 g. of the above mixture of isomers, 1 ml. of phosphorus oxychloride and 5 ml. of ethylene dichloride was warmed on a steam bath for about five minutes and then poured into ice water which contained ammonium hydroxide. The mixture was stirred until the ice melted and an insoluble solid was filtered off. The layers were separated and the ethylene dichloride layer was dried over anhydrous potassium carbonate and evaporated to dryness. The solid residue was taken up in n-hexane and filtered. After no solid separated from the hexane solution, the hexane was allowed to evaporate over a period of four days. There was thus obtained 0.5 g. (45%) of a mixture of approximately equal parts of 4,5-dichloroquinoline and 4,7-dichloroquinoline, M.P. 67–69° C., as shown by TLC using ether as the developing solvent and authentic samples of each compound as standards.

EXAMPLE 12

6-chloro-4-hydroxy-3-methylquinoline was prepared as follows: A mixture containing 2.0 g. of 4-chloroaniline, 2.7 g. of triethyl orthoformate, 2.5 g. of isopropylidene methylmalonate, and 30 ml. of Dowtherm A was heated slowly with stirring up to reflux, refluxed for three minutes and then allowed to cool. The product that separated was collected and recrystallized from isopropyl alcohol to yield 6 - chloro - 4-hydroxy-3-methylquinoline, M.P. 329–331° C.

*Analysis.*—Calcd. for $C_{11}H_8ClNO$ (percent): Cl, 17.24; N, 6.81. Found (percent): Cl, 17.76; N, 7.03.

EXAMPLE 13

(A) Isopropylidene 3-methylanilinomethylenemalonate was prepared following the procedure described in Example 1A using 10.7 g. of m-toluene, 14.8 g. of ethyl orthoformate, 15.8 g. of isopropylidene malonate and 1.0 g. of p-tolenesulfonic acid monohydrate. There was thus obtained 19.6 g. (75%) of isopropylidene 3-methylanilinomethylenemalonate, M.P. 119.5–121.0° C. Recrystallization of a 5.0 g. sample from ethanol yielded 4.7 g. of the product, M.P. 115.0–116.6° C. (corr.).

Analysis.—Calcd. for $C_{14}H_{15}NO_4$ (percent): C, 64.36; H, 5.79; N, 5.36. Found (percent): C, 64.52; H, 5.80; N, 5.25.

(B) Heating a sample of isopropylidene 3-methylanilinomethylenemalonate in refluxing Dowtherm A following the procedure described in Example 11B yields a mixture of 4-hydroxy-5-methylquinoline and 4-hydroxy-7-methylquinoline.

EXAMPLE 14

(A) 4-heptylidene 4-nitroanilinomethylenemalonate [also named 5-(4-nitroanilinomethylene)-4,6-dioxo-2,2-di-n-propyl-1,3-dioxan].—A mixture containing 2.8 g. of 4-nitroaniline, 3.2 g. of triethyl orthoformate and 4.0 g. of 4-heptylidene malonate was stirred on a steam bath. When a precipitate formed before all of the aniline had gone into solution, 20 ml. of ethanol was added and stirring was continued on the steam bath for ten minutes. The reaction mixture was allowed to cool and the precipitate was collected, recrystallized once from acetonitrile and once from isopropyl alcohol to yield 5.5 g. of 4 - heptylidene 4 - nitroanilinomethylenemalonate, M.P. 171.6–172.6° C. (corr.).

Analysis.—Calcd. for $C_{17}H_{20}N_2O_6$ (percent): C, 58.61; H, 5.79; N, 8.04. Found (percent): C, 58.56; H, 5.57; N, 8.03.

(B) 4-hydroxy-6-nitroquinoline was prepared from the product of Example 14A as follows: To 60 ml. of Dowtherm A heated to 240° C. was added with stirring 3.0 g. of 4-heptylidene 4-nitroanilinomethylenemalonate. The reaction mixture was heated to 240° C. and held there for about two minutes and was then allowed to cool to room temperature with stirring. The precipitate was collected, washed with n-pentane to yield 1.4 g. (85%) of 4-hydroxy-6-nitroquinoline, M.P. 334–335° C. with decomposition.

EXAMPLE 15

(A) 4-heptylidene 3-nitroanilinomethylenemalonate.— To a stirred solution containing 5.6 g. of 3-nitroaniline and 8.0 g. of 4-heptylidene malonate dissolved in 50 ml. of warm ethanol was added 6.4 g. of triethyl orthoformate, and the resulting mixture was stirred at room temperature for about thirty minutes and then cooled. The precipitate was collected, recrystallized from isopropyl alcohol and washed with n-pentane to yield 12.2 g. (87%) of 4-heptylidene 3-nitroanilinomethylenemalonate, M.P. 138.0–139.0° C.

Analysis.—Calcd. for $C_{17}H_{20}N_2O_6$ (percent): C, 58.61; H, 5.79; N, 8.04. Found (percent): C, 58.51; H, 5.60; N, 7.96.

(B) A mixture of 4-hydroxy-5-nitroquinoline and 4-hydroxy-7-nitroquinoline was prepared from the above product of Example 15A as follows: To 60 ml. of Dowtherm A heated to 240° C. was added with stirring 3.0 g. of 4-heptylidene 3-nitroanilinomethylenemalonate, the reaction mixture heated to 245° C. and then allowed to cool to room temperature with stirring. The precipitate was collected, washed with n-pentane and air-dried to yield 1.5 g. (91%) of a mixture containing 4-hydroxy-5-nitroquinoline and 4-hydroxy-7-nitroqinoline in the ratio of about one to two, as determined by the TLC procedure described above in Example 10B.

EXAMPLE 16

(A) 4 - heptylidene 3 - chloroanilinomethylenemalonate.—To a mixture containing 10.0 g. of 4-heptylidene malonate and 8.0 g. of triethyl orthoformate was added 6.4 g. of 3-chloroaniline; 25 ml. of ethanol was added to the resulting mixture. The mixture was heated on a steam bath until dissolution resulted, then allowed to cool and stand at room temperature for two hours. The resulting mixture was cooled in ice and the product that separated was collected, recrystallized from isopropyl alcohol and washed with n-pentane to yield 14 g. (83%) of 4-heptylidene 3-chloroanilinomethylene malonate, M.P. 121.5–123.0° C. (corr.).

Analysis.—Calcd. for $C_{17}H_{20}ClNo_4$ (percent): C, 60.44; H, 5.97; Cl, 10.50. Found (percent): C, 60.49; H, 6.24; Cl, 10.70.

(B) Heating a sample of 4-heptylidene 3-chloroanilinomethylenemalonate in refluxing Dowtherm A following the procedure described in Example 11B yields a mixture of 5-chloro-4-hydroxyquinoline and 7-chloro-4-hydroxyquinoline

EXAMPLE 17

6-chloro-4-hydroxy - 2 - methylquinoline.—A mixture containing 12.8 g. of 4-chloroaniline, 17.8 g. of ethyl orthoacetate and 14.4 g. of isopropylidene malonate was heated with stirring on a steam bath overnight, the ethanol formed by the reaction distilling off. The reaction mixture containing isopropylidene 4-chloroanilino ethylidenemalonate [Formula I where Ar is 4-chlorophenyl, R is H, and $R_1=R_2=R_3=$methyl] was allowed to cool and then dissolved in 250 ml. of Dowtherm A. The solution was refluxed for five minutes and then allowed to cool ot room temperature with stirring. The precipitate that separated was collected, washed with n-pentane and dried to yield 1.2 g. (62%) of 6-chloro-4-hydroxy-2-methylquinoline. A small amount of the product was recrystallized from dimethylformamide using decolorizing charcoal to yield the purified product, a yellow solid, M.P. 320–321° C. with decomposition.

Analysis.—Calcd. for $C_{10}H_8ClNO$ (percent): Cl, 18.31; N, 7.23. Found (percent): Cl, 18.17; N, 7.57.

Alternatively, 6-chloro-4-hydroxy-2-methylquinoline is obtained by directly heating the same quantities of 4-malonate in Dowtherm A as above, omitting the heating on the steam bath.

EXAMPLE 18

(A) Isopropylidene 3 - fluoroanilinomethylenemalonate.—A mixture containing 11.1 g. of 3-fluoroaniline, 14.8 g. of triethyl orthoformate and 15.8 g. of isopropylidene malonate was stirred and warmed on a steam bath for a few minutes whereupon a vigorous reaction ensued. The mixture set up to a cream-colored cake which was recrystallized from about 700 ml. of absolute ethanol to yield 24.9 g. (94%) of the white solid product, isopropylidene 3 - fluoroanilinomethylenemalonate, M.P. 159.0–160.0° C. (corr.), after drying in a vacuum oven at 60° C. overnight.

Analysis.—Calcd. for $C_{13}H_{12}FNO_4$ (percent): C, 58.87; H, 4.56; F, 7.16. Found (percent): C, 58.65; H, 4.54; F, 7.46.

(B) Heating a sample of isopropylidene 3-fluoroanilinomethylenemalonate in refluxing Dowtherm A following the procedure described in Example 11B yields a mixture of 5-fluoro-4-hydroxyquinoline and 7-fluoro-4-hydroxyquinoline.

EXAMPLE 19

(A) Isopropylidene 3 - trifluoromethylanilinomethylenemalonate was prepared following the procedure described in Example 18A using 16.1 y. of 3-trifluoromethylaniline, 14.8 g. of triethyl orthoformate and 15.8 g. of isopropylidene malonate. There was thus obtained 28.3 g. (90%) of isopropylidene 3-trifluoromethylanilinomethylenemalonate, M.P. 155.2–156.2° C. (corr.), after one recrystallization from about 500 ml. of absolute ethanol using decolorizing charcoal.

Analysis.—Calcd. for $C_{14}H_{12}F_3NO_4$ (percent): C, 53.34; H,3.84; F, 1809. Found (percent): C, 53.09; H, 3.92; F, 17.80.

(B) Heating a sample of isopropylidene 3-trifluoromethylanilinomethylenemalonate in refluxing Dowtherm A following the procedure described in Example 11B yields a mixture of 4-hydroxy-5-trifluoromethylquinoline and 4-hydroxy-7-trifluoromethylquinoline.

EXAMPLE 20

(A) Isopropylidene 1-naphthylaminomethylenemalonate.—A mixture containing 14.3 g. of 1-naphthylamine, 14.8 g. of ethyl orthoformate, 15.8 g. of isopropylidene malonate and 1.0 g. of p-toluenesulfonic acid monohydrate was stirred at room temperature for about seven minutes, next heated on a steam bath for about ten minutes to distill off the ethanol formed by the reaction, and then cooled to room temperature with stirring. The solid that separated was collected and recrystallized from 95% ethanol to yield 23.8 g. (80%) of isopropylidene 1-naphthylaminomethylenemalonate. A 5.0 g. sample was recrystallized two additional times from ethanol to yield 4.3 g. of the product melting at 149.2–150.8° C. (corr.).

Analysis.—Calcd. for $C_{17}H_{15}NO_4$ (percent), N, 4.71. Found (percent): N, 4.66, 4.71.

(B) 4-hydroxybenzo(h)quinoline was prepared by cyclizing the product of Example 20A as follows: To 190 ml. of Dowtherm A heated to reflux was added in 3 to 4 g. portions with stirring 18.8 g. of isopropylidene 1-naphthylaminomethylenemalonate. After a vigorous reaction subsided, the reaction mixture was cooled to room temperature with stirring. The resulting precipitate was collected, washed well with n-pentane and air-dried to yield 10.2 g. (83%) of 4-hydroxybenzo(h)quinoline monohydrate. A small portion was recrystallized from ethanol to yield the purified product melting at 250–215° C.

Analysis.—Calcd. for $C_{13}H_9NO$ (percent): C, 79.98; H, 4.65; N, 7.17. Found (percent): C, 73.29; H, 5.63; N, 6.52, 6.56; $H_2O$, 8.37. Found (dry basis) (percent): C, 79.98; H, 5.12; N, 7.12, 7.16.

EXAMPLE 21

(A) Isopropylidene 2 - pyridylaminomethylenemalonate.—A mixture containing 9.4 g. of 2-aminopyridine, 14.8 g. of triethyl orthoformate and 15.8 g. of isopropylidene malonate was heated on a steam bath with stirring for about twenty minutes and cooled to room temperature. The solid was collected and recrystallized from a large quantity of absolute ethanol using decolorizing charcoal to yield 18.9 g. (76%) of isopropylidene 2-pyridylaminomethylenemalonate, M.P. 175.2–176.4° C. (corr.).

Analysis.—Calcd. for $C_{12}H_{12}N_2O_4$ (percent): C, 58.05; H, 4.88; N, 11.29. Found (percent): C, 58.07; H, 5.03; N, 11.20.

(B) 4H-pyrido[1,2-a]pyrimidin-4-one.—A suspension containing 1.0 g. of isopropylidene 2-pyridylaminomethylenemalonate in 3 ml. of mineral oil was heated with stirring over a free flame. Considerable bubbling occurred between 180–240° C. and then subsided. The liquid portion of the reaction mixture was decanted into a clean test tube and diluted with n-pentane. The solid that separated was collected and recrystallized from isopropyl ether to yield 4H-pyrido[1,2-a]pyrimidin-4-one, M.P. 130–131° C.

Analysis.—Calcd. for $C_8H_6N_2O$ (percent): C, 65.74; H, 4.14; N, 19.17. Found (percent): C, 65.52; H, 3.90; N, 18.90.

This compound has been prepared by a different method by Adams and Pachter, J. Am. Chem. Soc. 74, 5491 (1952).

(C) 4H - pyrido[1,2 - a]pyrimidin - 4 - one was also prepared following the procedure described hereinbelow in Example 24B using 11.9 g. of isopropylidene 2-pyridylaminomethylenemalonate and 119 ml. of Dowtherm A. After one recrystallization from isopropyl ether and drying overnight in a vacuum oven at 80° C., there was thus obtained 4.1 g. (59%) of the product, M.P. 128.0–129.0° C. (corr.).

Analysis.—Calcd. for $C_8H_6N_2O$ (percent): C, 65.75; H, 4.14; N, 19.17. Found (percent): C, 65.52; H, 4.33; N, 18.95.

EXAMPLE 22

(A) Isopropylidene 6-methyl-2-pyridylaminomethylenemalonate.—A mixture of 10.8 g. of 2-amino-6-methylpyridine, 14.8 g. of ethyl orthoformate, 15.8 g. of isopropylidene malonate and 1.0 g. of p-toluenesulfonic acid monohydrate was stirred at room temperature for four hours with no apparent reaction. The mixture was then heated on a steam bath with stirring and the ethanol formed by the reaction removed by distillation. Heating was continued for an additional ten minutes whereupon the reaction mixture crystallized. The crystalline material was recrystallized twice from absolute ethanol to yield 11.4 g. (45%) of isopropylidene 6-methyl-2-pyridylaminomethylenemalonate, M.P. 155.2–160.0° C. (corr.).

Analysis.—Calcd. for $C_{13}H_{14}N_2O_4$ (percent): C, 59.53; H, 5.38; N, 10.68. Found (percent): C, 59.76; H, 5.47; N, 11.00.

(B) 6 - methyl - 4H-pyrido[1,2-a]pyrimidin-4-one.—A suspension of 10 g. of isopropylidene 6-methyl-2-pyridylaminomethylenemalonate in 100 ml. of mineral oil was heated with stirring. At 160° C. a clear red solution was obtained; after four minutes the temperature had reached 206° C. and bubbles began to form; after an additional six minutes bubbling had stopped (temperature of 245° C.) and the solution was quite dark. The hot reaction mixture was decanted into a clean flask and cooled with stirring, followed by chilling in an ice bath. The resulting precipitate was collected, washed with n-pentane and recrystallized from cyclohexane using decolorizing charcoal to yield 1.7 g. of 6-methyl-4H-pyrido[1,2-a]pyrimidin-4-one, M.P. 118.0–119.0° C. (corr.).

Analysis.—Calcd. for $C_9H_8N_2O$ (percent): C, 67.49; H, 5.03; N, 17.49. Found (percent): C, 67.71; H, 5.15; N, 17.23.

EXAMPLE 23

(A) Isopropylidene 3-methyl-2-pyridylaminomethylenemalonate.—A mixture containing 10.8 g. of 2-amino-3-methylpyridine, 14.8 g. of triethyl orthoformate and 15.8 g. of isopropylidene malonate was heated on a steam bath with stirring, allowing the ethanol formed by the reaction to distill off. After ten minutes the clear liquid reaction mixture crystallized to form a semi-solid cake. Heating was continued for an additional ten minutes and the reaction mixture then cooled. The solid was collected and recrystallized from absolute ethanol using decolorizing charcoal to yield 14.7 g. (56%) of isopropylidene 3-methyl-2-pyridylaminomethylenemalonate, M.P. 186.2–186.8° C. (corr.) with decomposition.

Analysis.—Calcd. for $C_{13}H_{14}N_2O_4$ (percent): C, 59.53; H, 5.38; N, 10.68. Found (percent): C, 59.75; H, 5.24; N, 10.61.

(B) 9-methyl-4H-pyrido[1,2-a]pyrimidin - 4 - one.—A stirred suspension of 8.6 g. of isopropylidene 3-methyl-2-pyridylaminomethylenemalonate in 86 ml. of mineral oil was heated. At a temperature of 170° C. a clear red solution resulted. Bubbles of carbon dioxide began to form about three minutes later at 198° C. and continued for about four minutes after which time the temperature was 240° C. Heating was continued one minute longer (temperature of 250° C.), the heating source removed, the dark red solution cooled by rapid stirring and then cooled well in an ice bath. The resulting precipitate was collected and recrystallized from about 400 ml. of cyclohexane using decolorizing charcoal to yield 2.2 g. (42%) of 9-methyl - 4H - pyrido[1,2-a]pyrimidin-4-one, M.P. 113.8–114.8° C. (corr.).

Analysis.—Calcd. for $C_9H_8N_2O$ (percent): C, 67.49; H, 5.03; N, 17.49. Found (percent): C, 67.71; H, 5.19; N, 17.35.

EXAMPLE 24

(A) Isopropylidene 3-ethyl - 6 - methyl - 2 - pyridylaminomethylenemalonate.—A mixture containing 8.6 g. of 3-ethyl-6-methyl-2-aminopyridine, 9.4 g. of triethyl orthoformate and 10.0 g. of isopropylidene malonate was stirred at room temperature; a little ethanol was added to facilitate stirring. The stirred mixture was heated on a steam bath and the ethanol (both that added and that formed by the reaction) was allowed to evaporate. The resulting clear solution was heated for an additional forty-five minutes whereupon the reaction mixture solidified. Heating was continued for an additional fifteen minutes and the reaction mixture then allowed to cool to room temperature. The solid was collected and recrystallized from absolute ethanol using decolorizing charcoal to yield 10.5 g. (57.5%) of isopropylidene 3-ethyl-6-methyl-2-pyridylaminomethylenemalonate, M.P. 162.0–165.0° C.

Analysis.—Calcd. for $C_{15}H_{18}N_2O_4$ (percent): C, 62.05; H, 6.25; N, 9.65. Found (percent): C, 61.97; H, 6.22; N, 9.54.

(B) 9-ethyl - 6 - methyl-4H-pyrido[1,2-a]pyrimidin-4-one.—To 80 ml. of Dowtherm A heated to reflux was added with stirring over a period of one minute 8.0 g. of isopropylidene 3-ethyl-6-methyl-2-pyridylaminomethylenemalonate. The reaction mixture was refluxed for an additional two minutes and then allowed to cool to room temperature with continued stirring. When no solid formed, the solution was diluted to 500 ml. with n-pentane and extracted three times with 50 ml. portions of 2.2 N HCl. The combined extracts were washed once with ether and made basic with 10% aqueous potassium hydroxide solution. The alkaline solution was extracted three times with small portions of chloroform. The combined chloroform extracts were dried and decolorized by stirring for ten minutes with solid anhydrous potassium carbonate and decolorizing charcoal, and then filtered. The chloroform was removed by heating on a steam bath to yield a brown oily residue which crystallized to a brown solid on standing overnight. The solid was recrystallized from 95% ethanol using decolorizing charcoal to yield 1.8 g. (35%) of pale yellow crystalline product, 9-ethyl-6-methyl - 4H - pyrido[1,2-a]pyrimidin-4-one, M.P. 61.0–62.0° C. (corr.).

Analysis.—Calcd. for $C_{11}H_{12}N_2O$ (percent): C, 70.18; H, 6.43; N, 14.88. Found (percent): C, 70.22; H, 6.62; N, 14.73.

EXAMPLE 25

(A) Isopropylidene 5 - bromo - 2 - pyridylaminomethylenemalonate.—To a mixture containing 17.3 g. of 2-amino-5-bromopyridine, 15.8 g. of isopropylidene malonate and 50 ml. of absolute ethanol was added with stirring 14.8 g. of triethyl orthoformate. The reaction mixture was warmed on a steam bath whereupon ethanol began ot boil off and a solid began to form. After ten minutes, only a pale yellow solid cake remained. This was heated for an additional fifteen minutes and then recrystallized from about 250 ml. of acetonitrile using decolorizing charcoal to yield 24.8 g. (76%) of the product, M.P. 192.0–192.4° C. (corr.) with decomposition, after drying for two hours in a vacuum oven at 90° C.

Analysis.—Calcd. for $C_{12}H_{11}BrN_2O_4$ (percent): Br, 24.43; N, 8.57. Found (percent): Br, 24.84; N, 8.36.

(B) 7-bromo - 4H - pyrido[1,2-a]pyrimidin - 4 - one.—To 100 ml. of Dowtherm A heated to reflux was added with stirring 10.0 g. of isopropylidene 5-bromo-2-pyridylaminomethylenemalonate whereupon a vigorous reaction ensued. The reaction mixture was refluxed for an additional three minutes and the dark solution was cooled to room temperature while stirring. When no solid separated, the solution was diluted with several volumes of n-pentane and the mixture extracted three times with 50 ml. portions of 2.2 N HCl. The combined extracts were washed twice with ether, made basic with 180 ml. of 10% aqueous potassium hydroxide, cooled well in an ice bath, and the solid that separated was collected. The solid was recrystallized from 95% ethanol to yield 4.7 g. of 7-bromo-4H-pyrido[1,2-a]pyrimidin - 4 - one, M.P. 126.0–127.0° C. (corr.).

Analysis.—Calcd. for $C_8H_5BrN_2O$ (percent): Br, 35.51; N, 12.45. Found (percent): Br, 35.91; N. 12.41.

EXAMPLE 26

(A) Isopropylidene 6-n-propyl-2-pyridylaminomethylenemalonate was prepared following the procedure described in Example 23A using 13.6 g. of 2-amino-6-n-propylpyridine, 14.8 g. of triethyl orthoformate and 15.8 g. of isopropylidene malonate. There was thus obtained 17.6 g. (61%) of the product, M.P. 151.0–153.0° C. (corr.) after recrystallization from about 200–300 ml. of 95% ethanol using decolorizing charcoal.

Analysis.—Calcd. for $C_{15}H_{18}N_2O_4$ (percent): C, 62.05; H, 6.25; N, 9.65. Found (percent): C, 62.20; H, 6.02; N, 9.94.

(B) 6 - n - propyl-4H-pyrido[1,2-a]pyrimidin-4-one was prepared following the procedure described in Example 24B using 12.6 g. of isopropylidene 6-n-propyl-2-pyridylaminomethylenemalonate and 126 ml. of Dowtherm A. There was thus obtained 7.0 g. of the product, 6-n-propyl - 4H - pyrido[1,2-a]pyrimidin-4-one, which was converted into its hydrochloride salt as follows: It was dissolved in dry ether and the ether solution treated with 20 ml. of 4 N HCl. The resulting gummy precipitate was collected and triturated several times with fresh ether to yield a solid which was recrystallized from isopropyl alcohol containing a small amount of ether to yield 4.9 g. of 6-n-propyl - 4H - pyrido[1,2-a]pyrimidin-4-one hydrochloride, M.P. 176–178° C.

EXAMPLE 27

(A) Isopropylidene 4,6-dimethyl-2-pyridylaminomethylenemalonate was prepared following the procedure described in Example 25A using 12.2 g. of 2-amino-4,6-dimethylpyridine, 14.8 g. of triethyl orthoformate, 15.8 g. of isopropylidene malonate and 25 ml. of absolute ethanol. There was thus obtained 17.4 g. (63%) of the product, M.P. 181.0–182.0° C. (corr.) after recrystallization from 95% ethanol using decolorizing charcoal.

Analysis.—Calcd. for $C_{14}H_{16}N_2O_4$ (percent): C, 60.86; H, 5.84; N, 10.14. Found (percent): C, 60.95; H, 6.00; N, 10.03.

(B) 6,8-dimethyl-4H-pyrido[1,2-a]pyrimidin-4-one was prepared following the procedure described in Example 23B using 12.2 g. of isopropylidene 4,6-dimethyl-2-pyridylaminomethylenemalonate and 122 ml. of Dowtherm A. There was thus obtained 4.0 g. of the product, M.P. 103.4–104.6° C. (corr.) after recrystallization from about 200 ml. of cyclohexane using decolorizing charcoal. The structure of this compound was confirmed by nuclear magnetic resonance analysis.

Analysis.—Calcd. for $C_{10}H_{10}N_2O$ (percent): C, 68.95; H, 5.79; N, 16.08. Found (percent): C, 68.82; H, 5.84; N, 16.30.

EXAMPLE 28

(A) Isopropylidene 2,3-dimethyl-6-pyridylaminomethylenemalonate was prepared following the procedure described in Example 25A using 12.2 g. of 2-amino-5,6-dimethylpyridine, 14.8 g. of triethyl orthoformate, 15.8 g. of isopropylidene malonate and 15 ml. of absolute ethanol. There was thus obtained 18.2 g. (66%) of the product, M.P. 217–218° C. (corr.) with decomposition after recrystallization from about 700 ml. of acetonitrile using decolorizing charcoal.

Analysis.—Calcd. for $C_{14}H_{16}N_2O_4$ (percent): C, 60.86; H, 5.84; N, 10.14. Found (percent): C, 60.73; H, 5.93; N, 10.21.

(B) 6,7-dimethyl-4H-pyrido[1,2-a]pyrimidin-4-one was prepared following the procedure described in Example 23B using 13.2 g. of isopropylidene 5,6-dimethyl-2-pyridylaminomethylenemalonate and 132 ml. of Dowtherm A. There was thus obtained 3.9 g. (47%) of the product, M.P. 116.8–118.6° C. (corr.), after recrystallization from cyclohexane using decolorizing charcoal.

*Analysis.*—Calcd. for $C_{10}H_{10}N_2O$ (percent): C, 68.95; H, 5.79; N, 16.08. Found (percent): C, 68.74; H, 5.95; N, 16.37.

(C) 1,6,7-trimethyl-4-oxo-4H-pyrido[1,2-a]pyrimidinium methyl sulfate.—To a solution containing 17.4 g. of 6,7-dimethyl-4H-pyrido[1,2-a]pyrimidin-4-one dissolved in 100 ml. of warm acetonitrile was added 12.6 g. of dimethyl sulfate, the resulting reaction mixture was stirred and refluxed on a steam bath for two and one-half hours. After the reaction mixture had stood overnight at room temperature, it was stirred with some decolorizing charcoal and filtered. The filtrate was evaporated to dryness on a steam bath under reduced pressure and the resulting syrupy residue was cooled to room temperature whereupon it crystallized. The crystalline material was recrystalized twice from isopropyl alcohol and once from isopropyl alcohol containing a small quantity of ethanol to yield 3.0 g. of 1,6,7-trimethyl-4-oxo-4H-pyrido[1,2-a]-pyrimidinium methyl sulfate, M.P. 168.9–170.6° C. (corr.) with decomposition.

*Analysis.*—Calcd. for $C_{12}H_{16}N_2O_5S$ (percent): N, 9.33; S, 10.67. Found (percent): N, 9.55; S, 11.04.

1,6,7-trimethyl-4-oxo - 4H - pyrido[1,2-a]-pyrimidinium methyl sulfate when administered orally at a dose level of 200 mg./kg. by the standard procedure of inhibiting carrageenin-induced local foot edema in rats was found to have anti-inflammatory activity.

EXAMPLE 29

(A) Isopropylidene 6-acetylamino - 2 - pyridylaminomethylenemalonate was prepared following the procedure described in Example 25A using 30.2 g. of 2-amino-6-acetylaminopyridine, 29.6 g. of triethyl orthoformate, 31.7 g. of isopropylidene malonate and 100 ml. of absolute ethanol. There was thus obtained 47.9 g. (79%) of the product, M.P. 226.0–226.5° C. (corr.) with decomposition after recrystallization from about 2500 ml. of 95% ethanol.

*Analysis.*—Calcd. for $C_{14}H_{15}N_3O_5$ (percent): C, 55.08; H, 4.95; N, 13.77. Found (percent): C, 54.94; H, 5.12; N, 13.86.

(B) A mixture of 6-acetylamino-4H-pyrido[1,2-a]-pyrimidin-4-one and 7-acetylamino-4-hydroxy-1,8-naphthyridine was prepared from the product of Example 29A as follows: To 380 ml. of Dowtherm A heated to reflux was added with stirring 38.0 g. of isopropylidene 6-acetyl-amino-2-pyridylaminomethylenemalonate over a period of about two minutes. The reaction mixture was refluxed for an additional three minutes and then cooled to room temperature with stirring. The solid that separated was collected, washed well with n-pentane and air-dried to yield 10.2 g. of 7-acetylamino-4-hydroxy-1,8-naphthyridine, M.P. 304–308° C. with decomposition. The filtrate was diluted with a large volume of n-pentane and the resulting yellow solid was collected, washed well with n-pentane and dried to yield 10.2 g. of 6-acetylamino-4H-pyrido-[1,2-a]pyrimidin-4-one, M.P. 158–163° C. A second crop of 2.1 g. of the latter product was obtained from the mother liquor on standing. 6-acetylamino-4H-pyrido-[1,2-a]pyrimidin-4-one was recrystallized from absolute ethanol using decolorizing charcoal to yield 8.3 g. of the purified product, M.P. 162.6–164.0° C. (corr.).

*Analysis.*—Calcd. for $C_{10}H_9N_3O_2$ (percent): C, 59.10; H, 4.46; N, 20.68. Found (percent): C, 59.15; H, 4.20; N, 20.38.

7-acetylamino-4-hydroxy-1,8-naphthyridine was recrystallized from water using decolorizing charcoal to yield 5.6 g. of the purified product, M.P. 319–320° C.

*Analysis.*—Calcd. for $C_{10}H_9N_3O_2$ (percent): C, 59.10; H, 4.46; N, 20.68. Found (percent): C, 59.21; H, 4.58; N, 20.86.

7-acetylamino-4-hydroxy-1,8-naphthyridine has been prepared by a different method by Adams, J. Am. Chem. Soc. 68, 1317 (1946).

EXAMPLE 30

(A) Isopropylidene 6-benzyl-2-pyridylaminomethylenemalonate was prepared following the procedure described in Example 25A using 18.2 g. of 2-amino-6-benzylpyridine, 14.8 g. of triethyl orthoformate, 15.8 g. of isopropylidene malonate and 25 ml. of absolute ethanol. There was thus obtained 13.7 g. of the product, M.P. 150.0–153.0° C. (corr.) after one recrystallization from absolute ethanol using decolorizing charcoal and a second recrystallization from 95% ethanol.

*Analysis.*—Calcd. for $C_{19}H_{18}N_2O_4$ (percent): C, 67.44; H, 5.36; N, 8.28. Found (percent): C, 67.69; H, 5.51; N, 8.33.

(B) 6-benzyl-4H-pyrido[1,2-a]pyrimidin-4-one was prepared following the procedure described in Example 23B using 9.0 g. of isopropylidene 6-benzyl-2-pyridylaminomethlyenemalonate and 90 ml. of Dowtherm A. There was thus obtained 3.9 g. of the product, M.P. 110.0–112.0° C. (corr.) when recrystallized from a very small amount of 95% ethanol using decolorizing charcoal.

*Analysis.*—Calcd. for $C_{15}H_{12}N_2O$ (percent): C, 76.25; H, 5.12; N, 11.86. Found (percent): C, 76.19; H, 5.35; N, 11.81.

EXAMPLE 31

(A) Isopropylidene 4 - n-hexyl-2-pyridylaminomethylenemalonate was prepared following the procedure described in Example 21A using 3.6 g. of 2-amino-4-n-hexylpyridine, 3.0 g. of triethyl orthoformate, 3.2 g. of isopropylidene malonate, and a heating period of one hour. After recrystallization from 95% ethanol using decolorizing charcoal, there was obtained 4.3 g. (65%) of the product, M.P. 102–103° C.

*Analysis.*—Calcd. for $C_{18}H_{24}N_2O_4$ (percent): C, 65.04; H, 7.28; N, 8.43. Found (percent): C, 64.85; H, 7.17; N, 8.22.

(B) 8 - n - hexyl-4H-pyrido[1,2-a]pyrimidin-4-one was prepared following the procedure described in Example 23B using 4.0 g. of isopropylidene 4-n-hexyl-2-pyridyl-aminomethylenemalonate and 40 ml. of Dowtherm A. After recrystallization from about 10 ml. of cyclohexane using decolorizing charcoal, there was obtained 2.1 g. (76%) of the product, M.P. 80.0–81.0° C. (corr.).

*Analysis.*—Calcd. for $C_{14}H_{18}N_2O$ (percent): C, 73.01; H, 7.88; N, 12.17. Found (percent): C, 73.02; H, 7.56; N, 12.06.

EXAMPLE 32

(A) Isopropylidene 3,4 - dimethyl - 2 - pyridylaminomethylenemalonate was prepared following the procedure described in Example 21A using 1.6 g. of 2-amino-3,4-dimethylpyridine, 2.0 g. of triethyl orthoformate, 2.0 g. of isopropylidene malonate, and a heating period of one hour. After recrystallization from about 25 ml. of absolute ethanol using decolorizing charcoal, there was obtained 2.3 g. (64%) of product, M.P. 165–167° C.

*Analysis.*—Calcd. for $C_{14}H_{16}N_2O_4$ (percent): C, 60.86; H, 5.84; N, 10.14. Found (percent): C, 60.74; H, 5.53; N, 10.13.

(B) 8,9 - dimethyl - 4H-pyrido[1,2-a]pyrimidin-4-one was prepared following the procedure described in Example 23B using 1.7 g. of isopropylidene 3,4-dimethyl-2-pyridylaminomethylenemalonate and 17 ml. of Dowtherm A. After recrystallization from absolute ethanol, there was obtained 0.65 g. of product, M.P. 169.6–171.6° C. (corr.).

*Analysis.*—Calcd. for $C_{10}H_{10}N_2O$ (percent): C, 68.95; H, 5.79; N, 16.08. Found (percent): C, 68.64; H, 5.88; N, 16.02.

EXAMPLE 33

(A) Isopropylidene 5 - methyl-2-pyridylaminomethylenemalonate was prepared following the procedure described in Example 25A using 25.8 g. of 2-amino-5-methylpyridine, 35.6 g. of triethyl orthoformate, 38.0 g. of isopropylidene malonate and 45 ml. of absolute ethanol. After recrystallization from acetonitrile using decolorizing charcoal, there was obtained 41.3 g. (66%) of the product, M.P. 181–183° C. A 6 g. sample was recrystallized a second time from acetonitrile to yield 4.6 g. of the product, M.P. 182.4–184.0° C. (corr.).

Analysis.—Calcd. for $C_{13}H_{14}N_2O_4$ (percent): C, 59.53; H, 5.38; N, 10.68. Found (percent): C, 59.35; H, 5.57; N, 10.76.

(B) 7 - methyl - 4H-pyrido[1,2-a]pyrimidin-4-one was prepared following the procedure described in Example 24B using 35.4 g. of isopropylidene 5-methyl-2-pyridylaminomethylenemalonate and 354 ml. of Dowtherm A. After three recrystallizations from cyclohexane, there was obtained 9.1 g. of the product, M.P. 78.8–82.8° C. (corr.).

Analysis.—Calcd. for $C_9H_8N_2O$ (percent): C, 67.49; H, 5.03; N, 17.49. Found (percent): C, 67.40; H, 5.28; N, 17.25.

EXAMPLE 34

(A) Isopropylidene 2,6 - dimethyl - 3 - pyridylaminomethylenemalonate.—A mixture containing 24.2 g. of 3-amino-2,6-dimethylpyridine, 29.6 g. of triethyl orthoformate and 28.8 g. of isopropylidene malonate was heated on a steam bath for about twenty minutes. The solidified reaction mixture was recrystallized once from isopropyl alcohol using decolorizing charcoal and then a second time from isopropyl alcohol, washed with n-pentane and air-dried to yield 34 g. of the product, M.P. 163.2–164.0° C. (corr.).

Analysis.—Calcd. for $C_{14}H_{16}N_2O_4$ (percent): C, 60.86; H, 5.84; N, 10.14. Found (percent): C, 61.08; H, 6.06; N, 10.04.

(B) 6,8 - dimethyl - 4 - hydroxy-1,7-naphthyridine.—To 240 ml. of Dowtherm A heated to 230° C. was added with stirring 24 g. of isopropylidene 2,6-dimethyl-3-pyridylaminomethylenemalonate. The temperature of the reaction mixture was raised to 245° C. (reflux) in about four to five minutes, the source of heat refluxed. Sufficient ethanol was added slowly with stirring to the hot reaction mixture (and allowed to boil off) to bring the reaction temperature below 200° C. The reaction mixture was allowed to cool to room temperature and the solid that separated was taken up in a small quantity of 6 N HCl, the acid solution treated with decolorizing charcoal and filtered, and the filtrate poured into a large volume of acetone with stirring. The resulting precipitate was collected and recrystallized from isopropyl alcohol and water (20:1) to yield 6,8-dimethyl-4-hydroxy-1,7-naphthyridine. When recrystallized from water using decolorizing charcoal, this product melted above 300° C. and analyzed as follows:

Analysis.—Calcd. for $C_{10}H_{10}N_2O$ (percent): C, 68.95; H, 5.79; N, 16.08. Found (percent): C, 68.96; H, 5.82; N, 16.24.

EXAMPLE 35

(A) Isopropylidene 6 - hydroxy-2-pyridylaminomethylenemalonate was prepared following the procedure described in Example 25A using 11.0 g. of 2-amino-6-hydroxypyridine, 14.8 g. of triethyl orthoformate, 15.8 g. of isopropylidene malonate, 25 ml. of absolute ethanol, and a heating period of two hours. After recrystallization from about 700 ml. of absolute ethanol using decolorizing charcoal, there was obtained 15.1 g. (57%) of the product, M.P. 210.5–211.0° C. (corr.). with decomposition.

Analysis.—Calcd. for $C_{12}H_{12}N_2O_5$ (percent): C, 54.54; H, 4.58; N, 10.60. Found (percent): C, 54.31; H, 4.77; N, 10.46.

(B) 6 - hydroxy - 4H - pyrido[1,2-a]pyrimidin-4-one was prepared following the procedure described in Example 29B using 6.9 g. of isopropylidene 6-hydroxy-2-pyridylaminomethylenemalonate and 69 ml. of Dowtherm A. After recrystallization from dimethylformamide using decolorizing charcoal, there was obtained 2.7 g. of the product, M.P. 288.0–289.2° C. (corr.). Nuclear magnetic resonance spectral data showed the product to be a pyrido[1,2-a]pyrimidine rather than a 1,8-naphthyridine.

Analysis.—Calcd. for $C_8H_6N_2O_2$ (percent): C, 59.26; H, 3.73; N, 17.28. Found (percent): C, 58.96; H, 4.04; N, 17.46.

EXAMPLE 36

(A) Isopropylidene 3-pyridylaminomethylenemalonate was prepared following the procedure described in Example 25A using 18.8 g. of 3-aminopyridine, 29.6 g. of triethyl orthoformate, 31.7 g. of isopropylidene malonate and 50 ml. of absolute ethanol. After recrystallization from 95% ethanol using decolorizing charcoal, there was obtained 35.0 g. (71%) of the product, M.P. 155.0–158.0° C. (corr.).

Analysis.—Calcd. for $C_{12}H_{12}N_2O_4$ (percent): C, 58.05; H, 4.88; N, 11.29. Found (percent): C, 58.27; H, 4.99; N, 11.40.

(B) 4-hydroxy-1,5-naphthyridine was prepared from the product of Example 36A as follows: To 50 ml. of Dowtherm A heated to reflux was added with stirring 5.0 g. of isopropylidene 3-pyridylaminomethylenemalonate and heating was continued for an additional three minutes. The reaction mixture was allowed to cool to room temperature with stirring. The solid that separated was collected, washed with n-pentane, dried, recrystallized from dimethylformamide using decolorizing charcoal, washed with acetone and air-dried to yield 0.7 g. of 4-hydroxy-1,5-naphthyridine, M.P. 332–335° C. with decomposition. An analytical sample was obtained by sublimation in vacuo.

Analysis.—Calcd. for $C_8H_6N_2O$ (percent): C, 65.75; H, 4.14; N, 19.17. Found (percent): C, 65.37; H, 4.19; N, 19.28.

The assigned structure was confirmed by nuclear magnetic resonance spectral analysis.

EXAMPLE 37

(A) Isopropylidene 2-methyl-5-pyridylaminomethylenemalonate was prepared following the procedure described in Example 25A using 21.6 g. of 5-amino-2-methylpyridine, 29.6 g. of triethyl orthoformate, 31.7 g. of isopropylidene malonate and 50 ml. of absolute ethanol. After recrystallization from about 500 ml. of 95% ethanol using decolorizing charcoal, there was obtained 52.9 g. (100%) of product, M.P. 178.6–179.8° C. (corr.).

Analysis.—Calcd. for $C_{13}H_{14}N_2O_4$ (percent): C, 59.53; H, 5.38; N, 10.68. Found (percent): C, 59.55; H, 5.42; N, 10.62.

(B) 4-hydroxy-6-methyl-1,5-naphthyridine.—To 421 ml. of Dowtherm A heated to reflux was added with stirring 42.1 g. of isopropylidene 2-methyl-5-pyridylaminomethylenemalonate and the mixture refluxed for five minutes with stirring. The stirred reaction mixture was allowed to cool to room temperature and the resulting precipitate was collected, washed well with n-pentane and air-dried. This solid was recrystallized from dimethylformamide using decolorizing charcoal to yield 10.4 g. of 4-hydroxy-6-methyl-1,5-naphthyridine, M.P. 322.0–323.0° C. with decomposition.

Analysis.—Calcd. for $C_9H_8N_2O$ (percent): C, 67.48; H, 5.03; N, 17.49. Found (percent): C, 67.26; H, 4.82; N, 17.48.

EXAMPLE 38

(A) Isopropylidene 2-methoxy-5-pyridylaminomethylenemalonate was prepared following the procedure described in Example 25A using 24.8 g. of 5-amino-2-methoxypyridine, 29.6 g. of triethyl orthoformate, 31.8 g. of isopropylidene malonate and 25 ml. of absolute ethanol. After recrystallization from about 1 liter of absolute ether using decolorizing charcoal, there was obtained 43.5 g. (78%) of the product, M.P. 154.6–156.2° C. (corr.).

*Analysis.*—Calcd. for $C_{13}H_{14}N_2O_5$ (percent): C, 56.11; H, 5.07; N, 10.07. Found (percent): C, 56.17; H, 5.26; N, 9.95.

(B) 4-hydroxy-6-methoxy-1,5-naphthyridine was prepared following the procedure described in Example 37B using 27.5 g. of isopropylidene 2-methoxy-5-pyridylaminomethylenemalonate and 275 ml. of Dowtherm A. After recrystallization from water using decolorizing charcoal, there was obtained 11.6 g. of the product, M.P. 273.0–274.0° C. (corr.).

*Analysis.*—Calcd. for $C_9H_8N_2O_2$ (percent): C, 61.36; H, 4.58; N, 15.90. Found (percent): C, 61.61; H, 4.68; N, 15.93.

EXAMPLE 39

(A) Isopropylidene 2-pyrimidylaminomethylenemalonate.—To a stirred mixture containing 19.0 g. of 2-aminopyrimidine, 31.7 g. of ispropylidene malonate and 50. ml. of absolute ethanol was added 29.6 g. of triethyl orthoformate and the resulting mixture was heated on a steam bath with stirring. A clear yellow solution resulted and after five minutes of heating a crystalline yellow solid separated to yield a semi-solid mass which was heated for about forty-five minutes until all volatile components had been removed. The solid cake that remained was recrystallized from about 2000 ml. of absolute ethanol to yield 41.7 g. (84%) of isopropylidene 2-pyrimidylaminomethylenemalonate, M.P. 206.6–208.0° C. (corr.) with decomposition.

*Analysis.*—Calcd. for $C_{11}H_{11}N_3O_4$ (percent): C, 53.01; H, 4.45; N, 16.86. Found (percent): C, 53.06; H, 4.49; N, 16.92.

(B) 4H-pyrimido[1,2-a]pyrimidin-4-one was obtained from the product of Example 39A as follows: To 365 ml. of Dowtherm A heated to reflux was added with stirring 36.5 g. of isopropylidene 2-pyrimidylaminomethylenemalonate over a period of three minutes and heating was continued for five minutes after which time the temperature had reached 250° C. The mixture was allowed to cool with stirring. The precipitate was collected, washed well with n-pentane and air-dried to yield 7.7 g. of product. The Dowtherm mother liquors were diluted with n-pentane and the solid that separated was collected, washed with n-pentane and air-dried to yield another 11.9 g. of product, a total yield of 19.6 g. (91%). The two portions of product were combined and recrystallized from a small volume of 95% ethanol using decolorizing charcoal to yield 14.2 g. of 4H-pyrimido[1,2-a]pyrimidin-4-one, M.P. 170.2–172.8° C. (corr.), a highly sternutatory agent.

*Analysis.*—Calcd. for $C_7H_5N_3O$ (percent): C, 57.14; H, 3.43; N, 28.56. Found (percent): C, 57.26; H, 3.32; N, 28.62.

EXAMPLE 40

(A) Isopropylidene 4,6-dimethyl-2-pyrimidylaminomethylenemalonate was prepared following the procedure described in Example 39A using 24.6 g. of 2-amino-4,6-dimethylpyrimidine, 31.7 g. of isopropylidene malonate, 50 ml. of absolute ethanol and 29.6 g. of triethyl orthoformate. After one recrystallization from absolute ethanol using decolorizing charcoal and a second recrystallization from acetonitrile, there was obtained 20.4 g. of isopropylidene 4,6 - dimethyl-2-pyrimidylaminomethylenemalonate, M.P. 174.6–176.0° C. (corr.).

*Analysis.*—Calcd. for $C_{13}H_{15}N_3O_4$ (percent): C, 56.31; H, 5.45; N, 15.16. Found (percent): C, 56.52; H, 5.65; N, 15.35.

(B) Heating a sample of isopropylidene 4,6-dimethyl-2-pyrimidylaminomethylenemalonate in refluxing Dowtherm A following the procedure described in Example 39B yields 6,8-dimethyl-4H-pyrimido[1,2-a]pyrimidin-4-one.

EXAMPLE 41

(A) Isopropylidene 2 - quinolylaminomethylenemalonate.—A mixture containing 19.5 g. of 2-aminoquinoline, 20.0 g. of triethyl orthoformate, 21.4 g. of isopropylidene malonate and 25 ml. of absolute ethanol was heated with stirring on a steam bath, allowing the ethanol to distill off. After about twenty-five minutes the mixture became too viscous to be stirred. Heating was continued for an additional ten minutes and the reaction mixture was then cooled. The resulting solid was recrystallized twice from acetonitrile, the first time using decolorizing charcoal, to yield 14.2 g. of isopropylidene 2-quinolylaminomethylenemalonate, M.P. 224.0–226.5° C. (corr.) with decomposition.

*Analysis.*—Calcd. for $C_{16}H_{14}N_2O_4$ (percent): C, 64.42; H, 4.73; N, 9.39. Found (percent): C, 64.33; H, 4.61; N, 9.49.

(B) 1H-pyrimido[1,2-a]quinolin-1-one.—To 100 ml. of Dowtherm A heated to reflux was added with stirring over a period of about one minute 10.0 g. of isopropylidene 2-quinolylaminomethylenemalonate and heating was continued for another four minutes. The reaction mixture was allowed to cool to room temperature and, when no solid separated, was diluted with three volumes of n-pentane and extracted three times with 100 ml. portions of 2.2 N HCl. In addition to a dissolved material, the aqueous layer contained a suspended solid which was filtered off. The filtrate was washed with ether, made basic with 10% aqueous potassium hydroxide solution and extracted with chloroform. The chloroform extract was dried over anhydrous potassium carbonate and evaporated on a steam bath to yield a residue which crystallized on cooling. This solid was recrystallized from 95% ethanol using decolorizing charcoal to yield 3.4 g. of 1H-pyrimido[1,2-a]quinolin-1-one, M.P. 112.5–114.8° C. (corr.).

*Analysis.*—Calcd. for $C_{12}H_8N_2O$ (percent): C, 73.46; H, 4.11; N, 14.28. Found (percent): C, 73.14; H, 4.05; N, 14.25.

1H-pyrimido[1,2-a]quinolin-1-one when administered orally at a dose level of 200 mg./kg. by the standard procedure of inhibiting carrageenin-induced local foot edema in rats found to have anti-inflammatory activity.

EXAMPLE 42

(A) Isopropylidene 3-quinolylaminomethylenemalonate was prepared following the procedure described in Example 41A using 15.0 g. of 3-aminoquinoline, 15.4 g. of triethyl orthoformate, 16.4 g. of isopropylidene malonate and 40 ml. of absolute ethanol. After two recrystallizations from acetonitrile, using decolorizing charcoal the first time, there was obtained 17.2 g. of isopropylidene 3-quinolylaminomethylenemalonte, M.P. 205.0–208.8° C. (corr.).

*Analysis.*—Calc'd for $C_{16}H_{14}N_2O_4$ (percent): C, 64.42; H, 4.73; N, 9.39. Found (percent): C, 64.58; H, 4.82; N, 9.51.

(B) Benzo[f][1,7]naphthyridin-1-ol was prepared as follows: To 172 ml. of Dowthern A heated to reflux was added with stirring 17.2 g. of isopropylidene 3-quinolylaminomethylenemalonate and heating was continued for five minutes. The reaction mixture was then allowed to cool to room temperature with stirring. The solid that separated was collected, washed successively with n-pentane and acetone, air-dried, recrystallized once from a small quantity of dimethylformamide using decolorizing charcoal, recrystallized a second time from about 60 ml. of acetic acid, washed with acetone and dried for several days in a vacuum oven at 80° C. to yield 6.8 g. (60%) of benzo[f][1,7]naphthyridin-1-ol, M.P. >300° C. The assigned structure was confirmed by nuclear magnetic resonance spectral analysis.

*Analysis.*—Calcd. for $C_{12}H_8N_2O$ (percent): C, 73.46; H, 4.11. Found (percent): C, 73.32; H, 4.21.

EXAMPLE 43

(A) Isopropylidene 5-quinolylaminomethylenemalonate was prepared following the procedure described in Example 41A using 28.2 g. of 5-aminoquinoline, 29.1 g. of triethyl orthoformate, 31.1 g. of isopropylidene malonate and 50 ml. of abosolute ethanol. After recrystallization from about 1500 ml. of absolute ethanol using decolorizing charcoal, there was obtained 39.5 g. (68%) of isopropylidene 5-quinolylaminomethylenemalonate, M.P. 178.0–179.4° C. (corr.) with decomposition.

*Analysis.*—Calcd. for $C_{16}H_{14}N_2O_4$ (percent): C, 64.42; H, 4.73; N, 9.39. Found (percent): C, 64.22; H, 4.98; N, 9.26.

(B) 1,7-phenanthrolin-4-ol was prepared as follows: To 340 ml. of Dowtherm A heated to reflux was added over a period of three minutes with stirring 34.1 g. of isopropylidene 5-quinolylaminomethylenemalonate and refluxing was continued for an additional three minutes. The reaction mixture was allowed to cool with stirring. The solid that separated was collected, washed successively with n-pentane and acetone, air-dried, recrystallized once from a small quantity of acetic acid using decolorizing charcoal and a second time from about 150 ml. of dimethylformamide, washed with acetone, and dried in a vacuum oven at 80° C. to yield 12.7 g. of product, M.P. 318–319° C.

1,7-phenanthrolin-4-ol was prepared by another procedure by Schivalkas et al., Chem. Abstr. 54, 14252 (1962), and reported to have a melting point of 311° C.

EXAMPLE 44

(A) Isopropylidene 6-quinolylaminomethylenemalonate was prepared following the procedure described in Example 41A using 26.1 g. of 6-aminoquinoline, 26.8 g. of triethyl orthoformate, 28.8 g. of isopropylidene malonate and 50 ml. of absolute ethanol. After one recrystallization from about 3000 ml. of acetonitrile, there was obtained 34.3 g. (64%) of isopropylidene 6-quinolylaminomethylenemalonate, M.P. 228.0–228.5° C. (corr.) with decomposition.

*Analysis.*—Calc'd for $C_{16}H_{14}N_2O_4$ (percent): C, 64.42; H, 4.73; N, 9.39. Found (percent): C, 64.29; H, 4.93; N, 9.28.

(B) 4,7-phenanthrolin-1-ol was obtained from the product of Example 44A as follows: To 295 ml. of Dowtherm A heated to reflux was added with stirring over a period of two minutes 29.5 g. of isopropylidene 6-quinolylaminomethylenemalonate and refluxing was continued for an additional four minutes. The reaction mixture was allowed to cool to room temperature with continued stirring. The solid that separated was collected, washed well with n-pentane and then with acetone and air-dried to yield 18.1 g. (93%) of product, M.P. 298–299° C. with decomposition. The product was recrystallized twice from dimethylformamide, using decolorizing charcoal the first time, to yield 10.4 g. purified product, 4,7-phenanthrolin-1-ol, M.P. 303–304° C.

*Analysis.*—Calc'd. for $C_{12}H_8N_2O$ (percent): C, 73.46; H, 4.11; N, 14.28. Found (percent): C, 73.25; H, 4.16; N, 14.07.

4,7-phenanthrolin-1-ol was prepared by another procedure by Kermack and Weatherhead, J. Chem. Soc. 1164 (1940), and reported to have a melting point of 298° C.

EXAMPLE 45

(A) Isopropylidene 8-quinolylaminomethylenemalonate was prepared following the procedure described in Example 41A using 24.9 g. of 8-aminoquinoline, 25.6 g. of triethyl orthoformate, 27.4 g. of isopropylidene malonate and 40 ml. of absolute ethanol. After three recrystallizations from acetonitrile, using decolorizing charcoal the first time, there was obtained 22.0 g. of isopropylidene 8-quinolylaminomethylenemalonate, M.P. 181.8–183.8° C. (corr.).

*Analysis.*—Calcd. for $C_{16}H_{14}N_2O_4$ (percent): C, 64.42; H, 4.73; N, 9.39. Found (percent): C, 64.52; H, 4.46; N, 9.25.

(B) 1,10-phenanthrolin-4-ol was prepared following the procedure described in Example 44B using 167 ml. of Dowtherm A and 16.7 g. of isopropylidene 8-quinolylaminomethylenemalonate. After one recrystallization from about 500 ml. of acetonitrile using decolorizing charcoal, there was obtained 6.8 g. of 1,10-phenanthrolin-4-ol, M.P. 207.5–209.0° C. (corr.).

*Analysis.*—Calcd. for $C_{12}H_8N_2O$ (percent): C, 73.46; H, 4.11; N, 14.28. Found (percent): C, 73.66; H, 4.27; N, 14.19.

1,10-phenanthrolin-4-ol was prepared by another procedure by Snyder and Freier, JACS 68, 1320 (1946), and reported to have a melting point of 214.0–215.0° C.

EXAMPLE 46

(A) Isopropylidene 7-quinolylaminomethylenemalonate was prepared following the procedure described in Example 41A using 7.3 g. of 7-aminoquinoline, 7.4 g. of triethyl orthoformate, 7.9 g. of isopropylidene malonate and 15 ml. of absolute ethanol. After recrystallization from about 400 ml. of absolute ethanol, there was obtained 9.1 g. (61%) of isopropylidene 7-quinolylaminomethylenemalonate, M.P. 196.8–197.0° C. (corr.) with decomposition.

*Analysis.*—Calcd. for $C_{16}H_{14}N_2O_4$ (percent): C, 64.42; H, 4.73; N, 9.39. Found (percent): C, 64.42; H, 4.82; N, 9.33.

(B) 1,7-phenanthrolin-10-ol.—To 80 ml. of Dowtherm A heated to reflux was added with stirring over a period of about one minute 8.0 g. of isopropylidene 7-quinolylaminomethylenemalonate and refluxing was continued for three minutes after the addition. The reaction mixture was allowed to cool to room temperature and then treated with about five volumes of n-pentane. A small quantity of brown material was filtered off using a sintered glass funnel and the filtrate was cooled well in an ice bath. The crystalline precipitate that separated was collected and recrystallized twice, once from cyclohexane and once from isopropyl ether using decolorizing charcoal, to yield 2.4 g. of 1,7-phenanthrolin-10-ol as its monohydrate.

*Analysis.*—Calcd. for $C_{12}H_8N_2O$ (percent): C, 73.46; H, 4.11; N, 14.28. Found (percent): C, 67.64; H, 4.82; N, 13.15; $H_2O$, 7.61. Found (dry basis) (percent): C, 73.21; H, 4.30; N, 14.23.

EXAMPLE 47

(A) Isopropylidene 6 - coumarinylaminomethylenemalonate.—A mixture containing 19.0 g. of 6-aminocoumarin, 17.8 g. of triethyl orthoformate, 17.3 g. of isopropylidene malonate and 200 ml. of absolute ethanol was refluxed for three hours and allowed to cool. The precipitate was collected, recrystallized from dimethylformamide using decolorizing charcoal, washed with acetone and dried in vacuo at 60° C. to yield 21 g. (56%) of isopropylidene 6-coumarinylaminomethylenemalonate, M.P. 257.0–257.5° C. (corr.) with decomposition.

*Analysis.*—Calcd. for $C_{16}H_{13}NO_6$ (percent): C, 60.95; H, 4.16; N, 4.44. Found (percent): C, 61.25; H, 4.25; N, 4.56.

(B) 10-hydroxy - 3-oxo-3H-pyrano[3,2-f]-quinoline.— To 300 ml. of refluxing Dowtherm A was added with stirring 16 g. of isopropylidene 6-coumarinylaminomethylenemalonate whereupon a vigorous reaction took place, with a precipitate forming after about two to three minutes. Refluxing was continued for five minutes and the reaction mixture was allowed to cool with stirring. The precipitate was collected, washed with n-hexane, dried in vacuo at 60° C. and recrystallized from dimethylformamide to yield 10 g. (94%) of 10-hydroxy-3-oxo-3H-pyrano[3,2-f]quinoline, M.P. >330° C.

*Analysis.*—Calcd. for $C_{12}H_7NO_3$ (percent): C, 67.60; H, 3.31; N, 6.57. Found (percent): C, 67.49; H, 3.33; N, 6.43.

EXAMPLE 48

(A) Isopropylidene 4 - sulfamylanilinomethylenemalonate.—To a warm mixture containing 17.2 g. of 4-aminobenzenesulfonamide, 15.8 g. of isopropylidene malonate, and 14.8 g. of triethyl orthoformate was added with stirring 0.5 g. of p-toluenesulfonic acid monohydrate, 200 ml. of isopropyl alcohol was added and the resulting mixture was heated with stirring on a steam bath for five minutes and then allowed to cool. The precipitate was collected and recrystallized from acetonitrile-dimethylacetamide (4:1), washed with ethanol and dried in a vacuum oven at 70° C. to yield 12.5 g. of isopropylidene 4-sulfamylanilinomethylenemalonate, M.P. 247.2–249.2° C. (corr.) with decomposition.

*Analysis.*—Calcd. for $C_{13}H_{14}N_2O_6S$ (percent): N, 8.60; S, 9.82. Found (percent): N, 8.68; S, 9.79.

(B) Heating a sample of isopropylidene 4-sulfamylanilinomethylenemalonate in Dowtherm A following the procedure described in Example 1B yields 4-hydroxy-6-sulfamylquinoline.

EXAMPLE 49

Isopropylidene 2,6-dimethylanilinomethylenemalonate was prepared as follows: A mixture containing 12.1 g. of 2,6-dimethylaniline, 14.8 g. of ethyl orthoformate, 15.8 g. of isopropylidene malonate and 0.5 g. of p-toluenesulfonic acid monohydrate was stirred at room temperature whereupon the temperature of the mixture rose slowly to 45° C. over a period of twenty minutes and a solid began to separate. The mixture was stirred at 40° C. overnight and cooled. The solid that separated was collected and air-dried to yield 18 g. of isopropylidene 2,6-dimethylanilinomethylenemalonate, M.P. 109.2–110.8° C. (corr.).

*Analysis.*—Calcd. for $C_{15}H_{17}NO_4$ (percent): C, 65.44; H, 6.22; N, 5.09. Found (percent): C, 65.22; H, 6.40; N, 4.94.

There was no reaction when isopropylidene 2,6-dimethyleneanilinomethylenemalonate was heated in Dowtherm A following the procedure described in Example 1B.

Following the above procedure for the preparation of isopropylidene 2,6 - dimethylanilinomethylenemalonate but using in place of 2,6-dimethylaniline a molar equivalent quantity of 2,6-dichloroaniline or 2,4,6-trimethylaniline, there was obtained isopropylidene 2,6 - dichloroanilinomethylenemalonate, M.P. 129.0–130.0° C. (corr.) or isopropylidene 2,4,6-trimethylanilinomethylenemalonate, M.P. 107–108.5° C., respectively. There was no reaction when either isopropylidene 2,6-dichloroanilinomethylenemalonate or isopropylidene 2,4,6 - trimethylanilinomethylenemalonate was heated in Dowtherm A following the procedure described in Example 1B.

EXAMPLE 50

Isopropylidene N-methylanilinomethylenemalonate was prepared as follows: A mixture containing 32.1 g. of N-methylaniline, 44.5 g. of ethyl orthoformate, 47.5 g. of isopropylidene malonate and 3.0 g. of p-toluenesulfonic acid monohydrate was heated on a steam bath for two hours with stirring and then allowed to stand over three days. The reaction mixture was then cooled in an ice bath and the solid that separated was collected, recrystallized twice from isopropyl alcohol and air-dried to yield 32.2 g. (41%) of isopropylidene N-methylanilinomethylenemalonate, M.P. 121.2–123.0° C. (corr.).

*Analysis.*—Calcd. for $C_{14}H_{15}NO_4$ (percent): C, 64.36; H, 5.79; N, 5.36. Found (percent): C, 64.31; H, 5.83; N, 5.17.

Isopropylidene N-ethylanilinomethylenemalonate, M.P. 156.8–160.0° C. (corr.), or N-n-hexylanilinomethylenemalonate is obtained following the above procedure using a molar equivalent quantity of N-ethylaniline or N-n-hexylaniline in place of N-methylaniline.

Isopropylidene N - methylanilinomethylenemalonate when administered orally to mice using a modified procedure of the photocell activity cage method of Dews [Brit. J. Pharmacol. 8, 46 (1953)] was found to have psychomotor depressant properties at a dose level of 100 mg./kg. of body weight. This same compound was found to increase the hexobarbital-induced sleeping time in mice when administered intraperitoneally forty mintues before intraperitoneal administration of 40 mg./kg. of hexobarbital; it was found to have an $ED_{50}$ of $52\pm7.9$ mg./kg., $ED_{50}$ being the effective dose in mg./kg. that caused fifty percent of the animals to exhibit a loss of righting reflex for one minute or more. These results indicate the compound has central nervous system depressant activity and is useful as a potentiator for barbiturates.

EXAMPLE 51

Isopropylidene 6-methyl - 1 - oxo-2-pyridylaminomethylenemalonate was prepared as follows: A mixture containing 15 g. of 2-amino-6-methylpyridine-N-oxide, 14.8 g. of triethyl orthoformate, 15.8 g. of isopropylidene malonate and 0.5 g. of p-toluenesulfonic acid hydrate was warmed on a steam bath for about five minutes and was then heated in vacuo on the steam bath for an additional five minutes to remove the ethanol formed by the reaction. The resulting solidified reaction mixture was triturated with isopropyl alcohol on the steam bath for a few minutes, cooled and filtered. The solid was recrystallized from ethanol using decolorizing charcoal to yield 10 g. (32%) of the product, M.P. 222.0–222.8° C. (corr.) with decomposition.

*Analysis.*—Calcd. for $C_{13}H_{14}N_2O_5$ (percent): C, 56.11; H, 5.02; N, 10.07. Found (percent): C, 56.15; H, 5.29; N, 10.09.

The above intermediate 2-amino - 6 - methylpyridine-N-oxide was prepared as follows: To 216 g. of 2-amino-6-methylpyridine was added 250 ml. of acetic anhydride, the mixture allowed to stand for fifteen minutes, and then evaporated on a rotary evaporator on a steam bath. To the resulting material containing 2-acetylamino-6-methylpyridine was added 280 ml. of 40% peracetic acid and 280 ml. of acetic acid. The resulting mixture was stirred for one hour at a temperature between 30 and 35° C. and then heated in an oil bath at 70° C. overnight. The mixture was then evaporated on a rotary evaporator on a steam bath. The remaining material was taken up in ethylene dichloride; the solution was washed with water and then twice with 5% aqueous potassium carbonate solution, dried over anhydrous potassium carbonate, and evaporated by heating in vacuo; and the resulting material was recrystallized from isopropyl alcohol and washed with n-pentane to yield 156 g. of 2-acetylamino-6-methylpyridine-N-oxide, M.P. 130–132° C.

*Analysis.*—Calcd. for $C_8H_{10}N_2O_2$ (percent): C, 57.82; H, 6.07; N, 16.86. Found (percent): C, 57.82; H, 6.06; N, 16.76.

A mixture containing 83 g. of 2-acetylamino-6-methylpyridine-N-oxide and 500 ml. of 15% aqueous potassium hydroxide solution was refluxed for three hours and then allowed to cool to room temperature. Concentrated hydrochloric acid was added to neutrality; the resulting clear solution was cooled and extracted with chloroform; and the chloroform solution evaporated to yield 15 g. of 2-amino-6-methylpyridine-N-oxide.

EXAMPLE 52

(A) Isopropylidene 6 - methyl -3 - nitro-2-pyridylaminomethylenemalonate was prepared following the procedure described in Example 25A using 12.7 g. of 2-amino-6-methyl - 3 - nitropyridine, 12.3 g. of triethyl orthoformate, 13.1 g. of isopropylidene malonate and 150 ml. of absolute ethanol. After recrystallization from absolute ethanol using decolorizing charcoal, there was obtained 12.4 g. (49%) of product, M.P. 182–183° C. A 5 g. portion of the product was recrystallized a second time from absolute ethanol using decolorizing charcoal to yield 4.5 g. of product, M.P. 177.2–179.8° C. (corr.).

*Analysis.*—Calcd. for $C_{13}H_{13}N_3O_6$ (percent): C, 50.81; H, 4.26; N, 13.68. Found (percent): C, 50.98; H, 4.29; N, 13.65.

(B) Heating a sample of isopropylidene 6-methyl-3-nitro-2-pyridylaminomethylenemalonate in Dowtherm A following the procedure described in Example 25B yields 6-methyl - 9 - nitro - 4H - pyrido[1,2-a]pyrimidin-4-one.

EXAMPLE 53

(A) Isopropylidene 6 - methyl - 5 - nitro-2-pyridyl-aminomethylenemalonate was prepared following the procedure described in Example 25A using 26.8 g. of 2-amino-6 - methyl - 5 - nitropyridine, 25.9 g. of triethyl orthoformate, 27.8 g. of isopropylidene malonate and 300 ml. of absolute ethanol. After recrystallizing from about 800 ml. of acetonitrile using decolorizing charcoal, there was obtained 34.7 g. (65%) of the product, M.P. 220.0–221.0° C. (corr.) with decomposition.

*Analysis.*—Calcd. for $C_{13}H_{13}N_3O_6$ (percent): C, 50.81; H, 4.26; N, 13.68. Found (percent): C, 50.77; H, 4.35; N, 13.67.

(B) Heating a sample of isopropylidene 6 - methyl-5-nitro - 2 - pyridylaminomethylenemalonate in Dowtherm A following the procedure described in Example 25B yields 6 - methyl - 7 - nitro-4H-pyrido[1,2-a]pyrimidin-4-one.

EXAMPLE 54

(A) Isopropylidene 2 - pyrazinylaminomethylene - malonate.—To a stirred mixture containing 21.8 g. of 2-aminopyrazine, 33.1 g. of isopropylidene malonate and 100 ml. of absolute ethanol was added 34.0 g. of triethyl orthoformate and the resulting mixture was heated on a steam bath for thirty minutes. The reaction mixture was chilled in an ice bath and the tan precipitate collected by filtration. The precipitate was recrystallized from dimethylformamide using decolorizing charcoal, washed with a small amount of acetone and dried to yield 40.5 g. (71%) of white crystalline product, isopropylidene 2-pyrazinylaminomethylenemalonate, M.P. 225.2–227.0° C. (corr.) with decomposition.

*Analysis.*—Calcd. for $C_{11}H_{11}N_3O_4$ (percent): C, 53.01; H, 4.45; N, 16.86. Found (percent): C, 52.59, 52.75; H, 4.45, 4.23; N, 16.98.

Isopropylidene 6 - methoxy - 3 - pyridazinylaminomethylenemalonate, M.P. 188–188.5° C. with decomposition, was obtained following the procedure described above in Example 54A using a molar equivalent quantity of 3-amino-6-methoxypyridazine in place of 2-aminopyrazine.

(B) 4H - pyrazino[1,2 - a]pyrimidin - 4-one was obtained from the product of Example 54A as follows: To 305 ml. of Dowtherm A heated to reflux was added with stirring 30.5 g. of isopropylidene 2-pyrazinylaminomethylenemalonate and heating was continued for five minutes. The reaction mixture was allowed to cool with stirring. The resulting precipitate was collected and recrystallized from about 600 ml. of 95% ethanol using decolorizing charcoal and dried in a vacuum oven at 70° C. overnight to yield 12.4 g. of 4H - pyrazino[1,2 - a]pyrimidin-4-one, M.P. 171.8–173.8° C. (corr.). The structure assigned to this compound was confirmed by its nuclear magnetic resonance spectrum.

*Analysis.*—Calcd. for $C_7H_5N_3O$ (percent): C, 57.14; H, 3.43; N, 28.56. Found (percent): C, 56.70; H, 3.86; N, 28.56.

7 - methoxy - 4H - pyrimido[1,2-b]pyridazin-4-one, M.P. 207–208° C., is obtained following the procedure described in Example 54B using a molar equivalent quantity of isopropylidene 6 - methoxy - 3 - pyridazinylaminomethylenemalonate in place of isopropylidene 2 - pyrazinylaminomethylenemalonate.

EXAMPLE 55

(A) Isopropylidene 3,5 - dinitroanilinomethylenemalonate.—To a stirred mixture containing 9.3 g. of 3,5-dinitroaniline, 8.1 g. of isopropylidene malonate and 45 ml. of absolute ethanol was added 7.6 g. of triethyl orthoformate and the resulting mixture was heated on the steam bath with stirring for about fifteen minutes, allowing the ethanol to evaporate. The resulting yellow solid was recrystallized twice from acetonitrile and dried in a vacuum oven to yield 3.1 g. of pale yellow crystalline product, isopropylidene 3,5 - dinitroanilinomethylenemalonate, M.P. 213.0–214.0° C. (corr.) with decomposition.

*Analysis.* Calcd. for $C_{13}H_{11}N_3O_8$ (percent): C, 46.30; H, 3.29; N, 12.46. Found (percent): C, 46.49, 46.55; H, 3.75, 3.59; N, 12.34.

(B) 5,7 - dinitro - 4 - hydroxyquinoline was prepared by cyclizing the product of Example 55A as follows: To 200 ml. of Dowtherm A heated to reflux (250° C.) was added with stirring 5.0 g. of isopropylidene 3,5-dinitroanilinomethylenemalonate over a period of thirty seconds. The reaction mixture was refluxed for an additional thirty seconds and was then allowed to cool to room temperature with stirring. The product that separated was collected, washed well with ether, triturated twice with boiling ethanol and dried in a vacuum oven to yield 1.2 g. (35%) of 5,7-dinitro-4-hydroxyquinoline, M.P.>360° C.

*Analysis.*—Calcd. $C_9H_5N_3O_5$ (percent): C, 45.97; H, 2.14; N, 17.87. Found (percent): C, 46.16; H, 2.13; N. 17.24.

EXAMPLE 56

(A) 2,2' - dithiodi(4 - chloro - ortho-phenylene)-di (iminomethylidyne)bis[isopropylidene malonate].—To a stirred mixture containing 97.3 g. of 2 - amino - 4 - chlorophenyl disulfide, 94.0 g. of isopropylidene malonate and 600 ml. of absolute ethanol was added 92.0 g. of triethyl orthoformate and the resulting mixture was heated on a steam bath with stirring. Within a few minutes the reaction mixture became a solid yellow cake which was heated for an additional forty minutes. The solid was boiled with 3.5 liters of acetonitrile, the undissolved solid was filtered off, and the filtrate was chilled in a cold room overnight. The undissolved solid was recrystallized from two liters of acetonitrile using decolorizing charcoal and air-dried to yield 27.6 g. of the product, M.P. 212–212.5° C. with decomposition. The precipitate which separated from the larger portion of acetonitrile was collected and air-dried to yield 101.4 g. of the product, M.P. 210–211° C. with decomposition. The two samples were then dried in a vacuum oven whereupon there was obtained 26.8 g. of the charcoaled sample, M.P. 215.0–217.0° C. (corr.) with decomposition and 98.7 g. of the uncharcoaled sample, M.P. 123° C. with decomposition. A portion of the charcoaled sample was analyzed as follows:

*Analysis.*—Calcd. for $C_{26}H_{22}Cl_2N_2O_8S_2$ (percent): Cl, 11.34; S, 10.25. Mol. wt. 625.5. Found (percent): Cl, 11.31; S, 10.38. Mol. wt., 640±5%.

(B) 6-chloro-4-hydroxy-8-quinolyl disulfide was prepared by cyclizing the product of Example 56A as follows: To 63 ml. of Dowtherm A heated to reflux was added with stirring over a period of ninety seconds, 6.3 g. of 2,2'-dithiodi(4-chloro - ortho - (iminomethylidyne)bis[isopropylidene malonate]. The reaction mixture was heated with stirring for an additional ninety seconds and then allowed to cool to room temperature with stirring. The solid that separated was collected to yield the product, 6-chloro-4-hydroxy-8-quinolyl disulfide.

EXAMPLE 57

(A) Isopropylidene 5 - uracilylaminomethylenemalonate.—A mixture containing 25.4 g. of 5-aminouracil, 29.6 g. of triethyl orthoformate, 31.7 g. of isopropylidene malonate and 500 ml. of absolute ethanol was refluxed with stirring for three hours and then the ethanol was distilled off by heating vacuo. The remaining solid residue was washed with acetone, recrystallized from about 2700 ml. of dimethylformamide using decolorizing charcoal, washed with acetone and dried in a vacuum oven to yield 23 g. of the product, M.P. 288–289° C. with decomposition.

*Analysis.*—Calcd. for $C_{11}H_{11}N_3O_6$ (percent): C, 46.98; H, 3.94; N, 14.94. Found (percent): C, 46.80; H, 3.89; N, 15.05.

(B) 1,5-dihydro-3H-pyrido[3,2 - d]pyrimidine - 2,4,8-trione.—To 291 ml. of diethyl phthalate heated to 290° C. was added with stirring and as rapidly as possible 29.1 g. of isopropylidene 5-uracilylaminomethylenemalonate. Heating at about the same temperature was continued with stirring for about fifteen minutes. The reaction mixture was then allowed to cool to room temperature with stirring. The precipitate was collected, washed well with ether and air-dried. The product was purified by dissolving it in 500 ml. of water containing 75 ml. of 10% potassium hydroxide solution, the dark solution was stirred at room temperature with decolorizing charcoal and filtered. The yellow filtrate was acidified with acetic acid and the cream-colored precipitate was collected, washed successively with water and acetone, and dried in a vacuum oven to yield 12.7 g. of 1,5-dihydro-3H - pyrido[3,2 - d]pyrimidine-2,4,8 - trione, M.P. >360° C.

*Analysis.*—Calcd. for $C_7H_5N_3O_3$ (percent): C, 46.93; H, 2.81; N, 23.46. Found (percent): C, 46.48; H, 2.93; N, 23.73.

EXAMPLE 58

(A) Isopropylidene 4 - methyl - 2 - thiazolylaminomethylenemalonate was prepared following the procedure described in Example 57A using 41.3 g. of 2-amino-4-methylthiazole, 59.0 g. of triethyl orthoformate, 57.4 g. of isopropylidene malonate and 120 ml. of absolute ethanol. After two recrystallizations from acetonitrile using decolorizing charcoal and one recrystallization from absolute ethanol, there was obtained 6.3 g. of the product, M.P. 189–190° C. with decomposition.

*Analysis.*—Calcd. for $C_{11}H_{12}N_2O_4S$ (percent): N, 10.44; S, 11.95. Found (percent): N, 10.34; S, 12.25.

(B) 3-methylpyrimido[2,1-b]thiazol-5 - one was prepared using 1.0 g. of isopropylidene 4-methyl-2-thiazolylaminomethylenemalonate and 10 ml. of diethyl phthalate, and following the procedure described in Example 57B with the following variation in isolation of the product. When no product precipitated from the cooled reaction mixture, about eight volumes of dry ether were added and a trace of dark solid was filtered off. The filtrate was extracted twice with 12.5 ml. portions of 1.2 N hydrochloric acid. The combined extracts were neutralized with 10% aqueous potassium hydroxide solution and extracted with chloroform. The chloroform extract was dried over anhydrous calcium sulfate, filtered and evaporated to dryness. The resulting yellow solid was recrystallized from 95% ethanol to yield 3-methylpyrimido[2,1-b]thiazol-5-one, M.P. 129–130° C.

EXAMPLE 59

(A) Isopropylidene 5-(1H - tetrazolyl)aminomethylenemalonate.—A mixture containing 25.8 g. of 5-amino-1H-tetrazole monohydrate, 37.0 g. of triethyl orthoformate, 39.6 g. of isopropylidene malonate and 520 ml. of absolute ethanol was refluxed with stirring for about seventy-five minutes during which time the product separated. The reaction mixture was cooled in an ice bath and the precipitate collected, air-dried, recrystallized from acetic acid using decclorizing charcoal, washed with acetone and dried in a vacuum oven to yield 29.5 g. of the product, M.P. 214° C. with decomposition.

*Analysis.*—Calcd. for $C_8H_9N_5O_4$ (percent): C, 40.17; H, 3.79; N, 29.28. Found (percent): C, 39.32, 39.81; H, 3.79, 3.62; N, 29.86, 29.58.

(B) Heating a sample of isopropylidene 5-(1H)-tetrazolylaminomethylenemalonate in diethyl phthalate following the procedure described in Example 57B yields 7-hydroxytetrazolo[1,5-a]pyrimidine.

EXAMPLE 60

(A) Isopropylidene 2-phenyl-3-pyrazolylaminomethylenemalonate.—A mixture containing 5.0 g. of 3-amino-2-phenylpyrazole, 5.0 g. of triethyl orthoformate, 5.0 g. of isopropylidene malonate and 25 ml. of absolute ethanol was heated on a steam bath with stirring for about five minutes allowing some of the ethanol to evaporate off during the heating period. The remaining ethanol was evaporated off and the residual solid was recrystallized from about 100 ml. of acetonitrile to yield 7.8 g. of isopropylidene 2-phenyl-3-pyrazolylaminomethylenemalonate, M.P. 173–174° C. with decomposition.

*Analysis.*—Calcd. for $C_{16}H_{15}N_3O_4$ (percent): C, 61.33; H, 4.83; N, 13.41. Found (percent): C, 61.11; H, 4.64; N, 13.45.

(B) Heating a sample of isopropylidene 2-phenyl-3-pyrazolylaminomethylenemalonate in diethyl phthalate following the procedure described in Example 57B yields 4-hydroxy-1-phenyl-1H-pyrazolo[3,4-b]pyridine.

(C) Following the procedures of Examples 60A and 60B starting with 3-amino-2-methylpyrazole in place of 3-amino-2-phenylpyrazole yields, respectively, isopropylidene 2-methyl-3-pyrazolylaminomethylenemalonate and 4-hydroxy-1-methyl-1H-pyrazolo[3,4-b]pyridine.

The following compounds are obtained by following the two-step procedure described in Examples 1A and 1B, using in the first step (like 1A) corresponding molar equivalent quantities of the appropriate aniline, ethyl orthoformate and isopropylidene malonate (use of p-toluenesulfonic acid monohydrate optional) and heating in the second step (like 1B) the resulting isopropylidene anilinomethylenemalonate in refluxing Dowtherm A to form the corresponding 4-hydroxyquinoline: isopropylidene 4-biphenylylaminomethylenemalonate (from 4-biphenylylamine) and 4-hydroxy-6-phenylquinoline; isopropylidene 4-n-butoxyanilinomethylenemalonate (from 4-n-butoxyaniline) and 6-n-butoxy-4-hydroxyquinoline; isopropylidene 4-ethylanilinomethylenemalonate (from 4-ethylaniline) and 6-ethyl-4-hydroxyquinoline; isopropylidene 2,4-dimethylanilinomethylenemalonate (from 2,4-dimethylaniline) and 6,8-dimethyl-4-hydroxyquinoline; isopropylidene 4 - methylmercaptoanilinomethylenemalonate (from 4-methylmercaptoaniline) and 4-hydroxy-6-methylmercaptoquinoline; isopropylidene 4-ethylsulfinylanilinomethylenemalonate (from 4-ethylsulfinylaniline) and 6-ethylsulfinyl-4-hydroxyquinoline; isopropylidene 4-n-butylsulfonylanilinomethylenemalonate (from 4-n-butylsulfonylaniline) and 6-n-butylsulfonyl-4-hydroxyquinoline; isopropylidene 4 - iodoanilinomethylenemalonate (from 4-iodoaniline) and 4-hydroxy-6-iodoquinoline; isopropylidene 4 - n-butylaminoanilinomethylenemalonate (from 4-n-butylaminoaniline) and 6-n-butylamino-4-hydroxyquinoline; isopropylidene 2-acetylaminoanilinomethylenemalonate (from 2-acetylaminoaniline) and 8-acetylamino-4-hydroxyquinoline; isopropylidene 4-propionylaminoanilinomethylenemalonate (from 4-propionylaminoaniline) and 4-hydroxy-6-propionylaminoquinoline; isopropylidene 4-benzyloxyanilinomethylenemalonate (from 4-benzyloxyaniline) and 6-benzyloxy-4-hydroxyquinoline; isopropylidene 4-hydroxyanilinomethylenemalonate (from 4-hydroxyaniline) and 4,6-dihydroxyquinoline; isopropylidene 2-benzylanilinomethylenemalonate (from 2-benzylaniline) and 8-benzyl-4-hydroxyquinoline; isopropylidene 3-benzylanilinomethylenemalonate (from 3-benzylaniline) and a mixture of 5-benzyl-4-hydroxyquinoline and 7-benzyl-4-hydroxyquinoline; isopropylidene 4-aminoanilinomethylenemalonate (from 4-aminoaniline) and 6-amino-4-hydroxyquinoline; isopropylidene 2-aminoanilinomethylenemalonate (from 2-aminoaniline) and 8-amino- 4 - hydroxyquinoline; isopropylidene 4-(unsubstituted-phenoxy)anilinomethylenemalonate [from 4 - unsubstituted-phenoxy)aniline] and 4-hydroxy-6-(unsubstituted-phenoxy)quinoline; isopropylidene 3-(unsubstituted-phenoxy)anilinomethylenemalonate [from 3-unsubstituted-phenoxy)aniline] and a mixture of 4-hydroxy-5-(unsubstituted-phenoxy)quinoline and 4-hydroxy-7-(unsubstituted-phenoxy)quinoline; isopropylidene 4-(unsubstituted-phenylmercapto)anilinomethylenemalonate [from 4-(unsubstituted-phenylmercapto)aniline] and 4-hydroxy-6-(unsubstituted-phenylmercapto)quinoline; isopropylidene 4-anilinoanilinomethylenemalonate (from 4-anilinoaniline) and 6-anilino-4-hydroxyquinoline; isopropylidene 3,5-xylidinomethylenemalonate, M.P. 170–172° C., (from 3,5-xylidine) and 5,7-dimethyl-4-hydroxyquinoline; isopropylidene 2,5-xylidinomethylenemalonate, M.P. 162–163° C., (from 2,5-xylidine) and 5,8-dimethyl-4-hydroxyquinoline; isopropylidene 3,4-xylidinomethylenemalonate, M.P. 135–137° C., (from 3,4-xylidine) and a mixture of 5,6-dimethyl-4-hydroxyquinoline and 6,7-dimethyl-4 - hydroxyquinoline; isopropylidene 2,3 - xylidinomethylenemalonate, M.P. 138–139° C., (from 2,3-xylidine) and 7,8 - dimethyl-4-hydroxyquinoline; isopropylidene 2,4-xylidinomethylenemalonate, M.P. 146–147° C., (from 2,4-xylidine) and 6,8-dimethyl-4-hydroxyquinoline.

The following compounds are obtained by following the two-step procedure described in Examples 21A and 21B, using in the first step (like 21A) corresponding molar equivalent quantities of the appropriate 2-aminopyridine, triethyl orthoformate and isopropylidene malonate and heating in the second step (like 21B) the resulting isopropylidene 2-pyridylaminomethylenemalonate in mineral oil to form the corresponding 4H-pyrido[1,2-a]pyrimidin-4-one: isopropylidene 4-methoxy-2-pyridylaminomethylenemalonate (from 2-amino-4-methoxypyridine) and 8-methoxy-4H-pyrido[1,2-a]pyrimidin-4-one; isopropylidene 5 - n-butoxy-2-pyridylaminomethylenemalonate (from 2-amino-5-n-butoxypyridine) and 7-n-butoxy-4H-pyrido[1,2-a]pyrimidin-4-one; isopropylidene 4-isopropyl-2-pyridylaminomethylenemalonate (from 2-amino-4-isopropylpyridine) and 8-isopropyl-4H-pyrido[1,2-a]pyrimidin-4-one; isopropylidene 6-propionylamino-2-pyridylaminomethylenemalonate (from 2-amino-6-propionylaminopyridine) and 6-propionylamino-4H-pyrido[1,2-a]pyrimidin-4-one; isopropylidene 4-hydroxy-2-pyridylaminomethylenemalonate (from 2-amino-4-hydroxypyridine) and 8-hydroxy-4H-pyrido[1,2-a]pyrimidin-4-one; isopropylidene 4 - benzyl-2-pyridylaminomethylenemalonate (from 2-amino-4-benzylpyridine) and 8-benzyl-4H-pyrido[1,2-a]pyrimidin-4-one; isopropylidene 3,6-diethyl-2-pyridylaminomethylenemalonate (from 2-amino-3,6-diethylpyridine) and 6,9-diethyl-4H-pyrido[1,2-a]pyrimidin-4-one; isopropylidene4,6-diethyl-2-pyridylaminomethylenemalonate (from 2-amino-4,6-diethylpyridine) and 6,8-diethyl-4H-pyrido[1,2-a]pyrimidin-4-one; isopropylidene 4 - methylmercapto - 2 - pyridylaminomethylenemalonate (from 2-amino-6-methylmercaptopyridine) and 6-methylmercapto - 4H-pyrido[1,2-a]pyrimidin-4-one; isopropylidene 4-methylsulfinyl 2-pyridylaminomethylenemalonate (from 2-amino-4-methylsulfinylpyridine) and 8-methylsulfinyl-4H-pyrido[1,2-a]pyrimidin-4-one; isopropylidene 6 - n - butylsulfonyl - 2-pyridylaminomethylenemalonate (from 2-amino-6-n-butylsulfonylpyridine) and 6-n-butylsulfonyl-4H-pyrido[1,2-a]pyrimidin-4-one; isopropylidene 6-n-butylamino-2-pyridylaminomethylenemalonate (from 2-amino-6-n-butylaminopyridine) and 6-n-butylamino-4H-pyrido[1,2-a]pyrimidin-4-one; isopropylidene 5-trifluoromethyl-2-pyridylaminomethylenemalonate (from 2-amino-5-trifluoromethylpyridine) and 7-trifluoromethyl-4H-pyrido[1,2-a]pyrimidin-4-one; isopropylidene 3,4,5-trimethyl - 2-pyridylaminomethylenemalonate (from 2-amino-3,4,5-trimethylpyridine) and 7,8,9-trimethyl-4H-pyrido[1,2-a]pyrimidin-4-one; isopropylidene 6-amino-2-pyridylaminomethylenemalonate (from 2,6-diaminopyridine) and 6-amino-4H-pyrido[1,2-a]pyrimidin-4-one; isopropylidene 4-methyl-2-pyridylaminomethylenemalonate, M.P. 191–192.5° C. (dec.), (from 2-amino-4-methylpyridine) and 8-methyl-4H-pyrido[1,2-a]pyrimidin-4-one.

The following compounds are obtained by following the two-step procedure described in Examples 34A and 34B, using in the first step (like 34A) corresponding molar equivalent quantities of the appropriate 3-amino-2-substituted-pyridine, triethyl orthoformate and isopropylidene malonate and heating in the second step (like 34B) the resulting isopropylidene 2 - substituted - 3 - pyridylaminomethylenemalonate in Dowtherm A to form the corresponding 8 - substituted - 4 - hydroxy - 1,7 - naphthyridine: isopropylidene 2 - ethyl - 3 - pyridylaminomethylenemalonate (from 3 - amino - 2 - ethylpyridine) and 8 - ethyl - 4 - hydroxy - 1,7 - naphthyridine; isopropylidene 2 - methoxy - 3 - pyridylaminomethylenemalonate, M.P. 179.5–181° C., (from 3 - amino - 2 - methoxypyridine) and 4-hydroxy - 8 - methoxy - 1,7 - naphthyridine; isopropylidene 2 - acetylamino - 3 - pyridylaminomethylenemalonate (from 2 - acetylamino - 3 - aminopyridine) and 8 - acetylamino - 4 - hydroxy - 1,7 - naphthyridine; and, isopropylidene 2 - n - butylamino - 3 - pyridylaminomethylenemalonate (from 3 - amino - 2 - n - butylaminopyridine) and 8-n-butylamino-4-hydroxy-1,7-naphthyridine.

The following compounds are obtained by following the two-step procedure described in Examples 36A and 36B using in the first step (like 36A) corresponding molar equivalent quantities of the appropriate 3-amino-2-unsubstituted-pyridine, triethyl orthoformate and isopropylidene malonate, and heating in the second step (like 36B) the resulting isopropylidene 2 - unsubstituted - 3 - pyridylaminomethylenemalonate in Dowtherm A to form a 4-hydroxy - 1,5 - naphthyridine when the pyridine ring contains a substituent at the 4-position or a mixture of a 4-hydroxy - 1,5 - naphthyridine and 4 - hydroxy - 1,7 - naphthyridine when the 4-position of the pyridine ring is unsubstituted: isopropylidene 4,6 - dimethyl - 3 - pyridylaminomethylenemalonate, M.P. 179–180° C. (dec.), (from 3 - amino - 4,6 - dimethylpyridine) and 6,8 - dimethyl - 4-hydroxy - 1,5 - naphthyridine; isopropylidene 5 - methyl-3 - pyridylaminomethylenemalonate, M.P. 184–185° C. (dec.), (from 3 - amino - 5 - methylpyridine) and a mixture of 4 - hydroxy - 7 - methyl - 1,5 - naphthyridine and 4 - hydroxy - 5 - methyl - 1,7 - naphthyridine; 4 - heptylidene 6 - methyl - 3 - pyridylaminomethylenemalonate, M.P. 136–137° C., (using 3 - amino - 6 - methylpyridine and 4-heptylidene malonate in place of isopropylidene malonate) and a mixture of 4-hydroxy-6-methyl-1,5-naphthyridine and 4 - hydroxy - 6 - methyl - 1,7 - naphthyridine; isopropylidene 6 - dimethylamino - 3 - pyridylaminomethylenemalonate, M.P. 167–168° C., (from 3-amino-6-dimethylaminopyridine) and a mixture of 6-dimethylamino-4 - hydroxy - 1,5 - naphthyridine and 6 - dimethylamino-4 - hydroxy - 1,7 - naphthyridine; isopropylidene 6 - ethoxy - 3 - pyridylaminomethylenemalonate, M.P. 167.5–169° C., (from 3 - amino - 6 - ethoxypyridine) and a mixture of 6 - ethoxy - 4 - hydroxy - 1,5 - naphthyridine and 6-ethoxy-4-hydroxy-1,7-naphthyridine.

two-step procedure described in Examples 56A and 56B, using in the first step (like 56A) corresponding molar equivalent quantities of the appropriate diamine, triethyl orthoformate and isopropylidene malonate and heating in the second step (like 56B) the resulting 2,2'-disubstituted-di(iminomethylidyne(bis[isopropylidene malonate] in Dowtherm A to form the corresponding cyclized product: 2,5 - dimethyl - 1,4 - phenylene - 2,2' - di(iminomethylidyne)bis[isopropylidene malonate] (from 2,5 - dimethyl-1,4 - phenylenediamine) and 4,9 - dihydroxy - 5,10 - dimethylpyrido[2,3 - g]quinoline; 2,5 - dichloro - 1,4-phenylene - 2,2' - di(iminomethylidyne)bis[isopropylidene malonate] (from 2,5 - dichloro - 1,4 - phenylenediamine) and 5,10 - dichloro - 4,9 - dihydroxypyrido[2,3 - g]quinoline; 4,4' - diphenylene - 2,2' - di(iminomethylidyne)bis[isopropylidene malonate], M.P. 224–225° C. with decomposition, (from 4,4' - biphenylenediamine) and bis (4 - hydroxy - 6 - quinolyl); 2,2' - methylene - di(para-phenylene)di(iminomethylidyne)bis[isopropylidene malonate] [from bis(4 - aminophenyl)methane] and bis(4-hydroxy - 6 - quinolyl)methane; 2,2' - oxy - di(para-phenylene)di(iminomethylidyne)bis[isopropylidene malonate] (from 4 - aminophenyl ether) and 4 - hydroxy - 6-quinolyl ether; 2,2' - thiodi(para - phenylene)di(iminomethylidyne)bis[isopropylidene malonate] (from 4-aminophenyl sulfide) and 4 - hydroxy - 6 - quinolyl sulfide; 2,2'-iminodi(para - phenylene)di(iminomethylidyne)bis[isopropylidene malonate] [from N,N - bis(4 - aminophenyl)-amine] and N,N - bis(4 - hydroxy - 6 - quinolyl)amine; 2,2' - methyliminodi(para - phenylene)di(iminomethylidyne)bis]isopropylidene malonate] [from N,N - bis(4-aminophenyl)methylamine] and N,N - bis(4 - hydroxy - 6-quinolyl)methylamine; 2,2' - carbonyldi(para - phenylene) di(iminomethylidyne)bis[isopropylidene malonate] [from bis(4 - aminophenyl)ketone] and bis(4 - hydroxy - 6-quinolyl)ketone.

Following the procedure described in Example 56A using a molar equivalent quantity of 2,6-diaminopyridine in place of 2 - amino - 4 - chlorophenyl disulfide, there was obtained diisopropylidene 2,6 - pyridinediylbis(aminomethylenemalonate), M.P. 261–262° C. with decomposition.

Following the two-step procedure described in Examples 20A and 20B using a molar equivalent quantity of the appropriate naphthylamine in place of 1-naphthylamine in the first step, the following compounds are prepared: isopropylidene 4 - ethoxy - 1 - naphthylaminomethylenemalonate (using 4 - ethoxy - 1 - naphthylamine) and 6 - ethoxy - 4 - hydroxybenzo(h)quinoline; isopropylidene 3,4 - dimethyl - 1 - naphthylaminomethylenemalonate (using 3,4 - dimethyl - 1 - naphthylamine) and 5,6 - dimethyl - 4 - hydroxybenzo(h) quinoline; isopropylidene 4 - benzyl - 1 - naphthylaminomethylenemalonate (using 4 - benzyl - 1 - naphthylamine) and 6 - benzyl - 4 - hydroxybenzo(h) quinoline; isopropylidene 2 - naphthylaminomethylenemalonate (using 2 - naphthylamine) and 4 - hydroxybenzo (f)quinoline; and, isopropylidene 4 - chloro - 3 - methoxy - 2 - naphthylaminomethylenemalonate (using 4 - chloro - 3 - methoxy - 2 - napthylamine) and 6 - chloro - 4 - hydroxy-5-methoxybenzo(f)quinoline.

Following the two-step procedure described in Examples 39A and 39B using a molar equivalent quantity of the appropriate aminopyrimidine in place of 2-aminopyrimidine in the first step, the following compounds are prepared: isopropylidene 4,6 - dimethoxy - 2 - pyrimidylaminomethylenemalonate, M.P. 169–170° C., (using 4,6-dimethoxy-2-aminopyrimidine) and 6,8 - dimethoxy-4H-pyrimido[1,2-a]pyrimidin - 4 - one; isopropylidene 4,6-di-chloro-2-pyrimidylaminomethylenemalonate, M.P. 181–183° C., (using 4,6 - dichloro-2-aminopyrimidine) and 6,8-dichloro-4H-pyrimido - [1,2 - a]pyrimidin-4-one; isopropylidene 5-hydroxy-2-pyrimidylaminomethylenemalonate (using 5-hydroxy - 2 - aminopyrimidine) and 7-hydroxy-4H-pyrimido[1,2-a]pyrimidin - 4 - one; isopropylidene 5 - benzyl - 2 - pyrimidylaminomethylenemalonate (using 5-benzyl-2-aminopyrimidine) and 7-benzyl-4H-pyrimido[1,2-a]pyrimidin-4-one; and isopropylidene 5-n-butylamino-2-pyrimidylaminomethylenemalonate (using 2-amino-5-n-butylaminopyrimidine) and 7-n-butylamino-4H-pyrimido[1,2-a]pyrimidin-4-one.

Following the two-step procedure described in Examples 41A and 41B using a molar equivalent quantity of the appropriate aminoquinoline in place of 2-aminoquinoline in the first step, the following compounds are prepared: isopropylidene 4-ethoxy-2-quinolylaminomethylenemalonate (using 2-amino-4-ethoxyquinoline) and 6-ethoxy - 1H - pyrimido[1,2 - a]quinolin-1-one; isopropylidene 4 - trifluoromethyl-2-quinolylaminomethylenemalonate (using 2 - amino - 4 - trifluoromethylquinoline) and 6-trifluoromethyl-1H-pyrimido[1,2-a]quinolin-1-one; isopropylidene 4,7-dichloro-2-quinolylaminomethylenemalonate (using 2-amino-4,7-dichloroquinoline) and 6,9 - di-chloro-1H-pyrimido[1,2-a]quinoyin - 1 - one; and, isopropylidene 3 - methyl - 2-quinolylaminomethylenemalonate (using 2-amino-3-methylquinoline) and 5 - methyl-1H-pyrimido[1,2-a]quinolin-1-one.

Following the two-step procedure described in Examples 47A and 47B using a molar equivalent quantity of the appropriate aminocoumarin in place of 6-aminocoumarin in the first step, the following compounds are prepared: isopropylidene 4 - methyl-6-coumarinylaminomethylenemalonate (using 6 - amino-4-methylcoumarin) and 10-hydroxy-1-methyl-3-oxo-3H-pyrano[3,2-f]quinoline; isopropylidene 4,8 - dimethyl - 6 - coumarinylaminomethylenemalonate (using 6 - amino - 4,8 - dimethylcoumarin) and 1,5 - dimethyl-10-hydroxy-3-oxo-3H-pyrano[3,2-f]quinoline; and isopropylidene 8-methoxy-3-methyl - 2 - coumarinylmethylenemalonate (using 2-amino-8-methoxy-3-methylcoumarin) and 10 - hydroxy-5- methoxy-2-methyl-3-oxo-3H-pyrano[3,2-f]quinoline.

Following the two-step procedure described in Examples 54A and 54B using a molar equivalent quantity of the appropriate aminopyrazine in place of 2-aminopyrazine in the first step, the following compounds are prepared: isopropylidene 3 - methyl - 2 - pyrazinylaminomethylenemalonate (using 2 - amino-3-methylpyrazine) and 9-methyl-4H-pyrazino[1,2-a]pyrimidin - 4 - one; isopropylidene 5-n-butoxy-2-pyrazinylaminomethylenemalonate (using 2-amino-5-n-butoxypyrazine) and 7-n-butoxy-4H-pyrazino-[1,2-a]pyrimidin-4-one; and, isopropylidene 6-hydroxy-2-pyrazinylaminomethylenemalonate (using 2-amino-6-hydroxypyrazine) and 6 - hydroxy-4H-pyrazino [1,2-a]-pyrimidin-4-one.

In addition to having utility as intermediates, compounds of Formula I also have been found to have antiviral activity when tested by standard procedures; for example, when administered orally or subcutaneously at respective dose levels of up to 400 or 200 mg./kg./day to mice infected with vaccinia virus, they were found to increase survival time over untreated controls and to cure up to about 80% of the mice tested.

The anti-inflammatory activity of the (4-oxo-6-$R_3$-2,3-pyrimido)-Ar products of my process is measured by the inhibition of carrageenin-induced local foot edema in fasted rats generally according to the procedure of C. A. Winter et al., Proc. Soc. Exptl. & Med. 111, 544–547 (1962) as follows: Food is withdrawn from male albino rats weighing approximately 110–124 gms., eighteen hours prior to a single oral medication of the test compound. Each compound is administered to at least five rats. One hour following the medication, 0.05 ml. of 1% aqueous suspension of carrageenin is injected into the plantar tissue of the right hind foot. Three hours after injections, the rats are sacrificed and the hind feet cut off at the tibio-calcaneo-talar joint for subsequent weighting. The observed difference between the average edema weight of the control and medicated rats is expressed as percent inhibition of edema. When tested by the above-described procedure, the (4-oxo - 6-$R_3$ - 2,3-pyrimido)-Ar products are found to inhibit local edema due to carrageenin-induced inflammation when administered at oral dose levels between about 10 and 200 mg./kg.

The actual determination of the numerical biological or chemotherapeutic data definitive for a particular compound is readily obtained by standard test procedures, referred to above, by technicians versed in pharmacological or chemotherapeutic test procedures, without any need for any extensive experimentation.

The (4-oxo-6-$R_3$-2,3-pyrimido)-Ar products or the alkylidene Ar-aminomethylenemalonates of Formula I can be prepared for use by conventional pharmaceutical procedures: that is, by dissolving or suspending them in a pharmaceutical acceptable vehicles, e.g., aqueous alcohol, glycol, oil solution, or oil-water emulsion, for parenteral or oral administration; by incorporating them in unit dosage form as tablets or capsules for oral administration, either alone or in combination with conventional adjuvants,

I claim:
1. A compound of the formula:

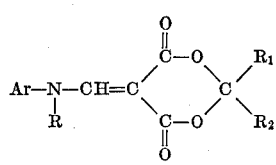

wherein Ar is a member of the group consisting of phenyl, naphthyl, biphenylyl, pyridyl, pyrimidyl, pyrazinyl, pyridazinyl, thiazolyl, tetrazolyl, pyrazolyl, quinolyl and coumarinyl, and such members substituted at available ring carbon positions by from one to three substituents selected from the group consisting of lower-alkyl, lower-alkoxy, lower-alkylmercapto, lower-alkylsulfinyl, lower-alkylsulfonyl, halo, trihalomethyl, nitro, amino, lower-alkylamino, lower-alkanoylamino, benzyloxy, hydroxy and benzyl, R is hydrogen or lower-alkyl, and, $R_1$ and $R_2$ are each lower-alkyl.

2. A compound according to claim 1 where Ar is phenyl, R is hydrogen, and $R_1$ and $R_2$ are each lower-alkyl.

3. A compound according to claim 1 where Ar is naphthyl, R is hydrogen, and $R_1$ and $R_2$ are each lower-alkyl.

4. A compound according to claim 1 where Ar is pyridyl, R is hydrogen, and $R_1$ and $R_2$ are each lower-alkyl.

5. A compound according to claim 1 where Ar is quinolyl, R is hydrogen, and $R_1$ and $R_2$ are each lower-alkyl.

6. A compound according to claim 1 where Ar is pyrimidyl, R is hydrogen, and $R_1$ and $R_2$ are each lower-alkyl.

7. Isopropylidene 4-methoxyanilinomethylenemalonate according to claim 1 where Ar is 4-methoxyphenyl, R is hydrogen, and $R_1$ and $R_2$ are each methyl.

8. Isopropylidene 4-nitroanilinomethylenemalonate according to claim 1 where Ar is 4-nitrophenyl, R is hydrogen, and $R_1$ and $R_2$ are each methyl.

9. Isopropylidene 4-methoxy-2-nitroanilinomethylenemalonate according to claim 1 where Ar is 4-methoxy-2-nitrophenyl, R is hydrogen, and $R_1$ and $R_2$ are each methyl.

10. Isopropylidene 3-chloroanilinomethylenemalonate according to claim 1 where Ar is 3-chlorophenyl, R is hydrogen, and $R_1$ and $R_2$ are each methyl.

11. Isopropylidene 3-trifluoromethylanilinomethylenemalonate according to claim 1 where Ar is 3-trifluoromethylphenyl, R is hydrogen, and $R_1$ and $R_2$ are each methyl.

12. Isopropylidene 1-naphthylaminomethylenemalonate according to claim 1 where Ar is 1-naphthyl, R is hydrogen, and $R_1$ and $R_2$ are each methyl.

13. Isopropylidene 6-methyl-2-pyridylaminomethylenemalonate according to claim 1 where Ar is 6-methyl-2-pyridyl, R is hydrogen, and $R_1$ and $R_2$ are each methyl.

14. Isopropylidene quinolylaminomethylenemalonate according to claim 1 where Ar is quinolyl, R and $R_3$ are each hydrogen, and $R_1$ is methyl.

15. Isopropylidene pyrimidylaminomethylenemalonate according to claim 1 where Ar is pyrimidyl, R is hydrogen, and $R_1$ and $R_2$ are each methyl.

16. Isopropylidene 6-coumarinylaminomethylenemalonate according to claim 1 where Ar is 6-coumarinyl, R is hydrogen, and $R_1$ and $R_2$ are each methyl.

17. Isopropylidene 2-pyrazinylaminomethylenemalonate according to claim 1 where Ar is 2-pyrazinyl, R is hydrogen, and $R_1$ and $R_2$ are each methyl.

18. Isopropylidene 3-pyridazinylaminomethylenemalonate according to claim 1 where Ar is 3-pyridazinyl, R and $R_3$ are each hydrogen, and $R_1$ and $R_2$ are each methyl.

19. Isopropylidene 2-thiazolylaminomethylenemalonate according to claim 1 where Ar is 2-thiazolyl, R is hydrogen, and $R_1$ and $R_2$ are each methyl.

20. Isopropylidene 5-(1H-tetrazolyl)aminomethylenemalonate according to claim 1 where Ar is 5-(1H-tetrazolyl), R is hydrogen, and $R_1$ and $R_2$ are each methyl.

21. Isopropylidene 2-phenyl-3-pyrazolylaminomethylenemalonate according to claim 1 where Ar is 2-phenyl-3-pyrazolyl, R is hydrogen, and $R_1$ and $R_2$ are each methyl.

22. The process for the preparation of a compound according to claim 1 where Ar is defined as in claim 1, R is hydrogen or lower-alkyl, and, $R_1$ and $R_2$ are each lower-alkyl, which comprises reacting an amine of the formula Ar-NHR with a mixture of a trialkyl ortho-ester of the formula $[R_3C(OR')_3]HC(OR')_3$ and an alkylidene malonate of the formula

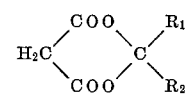

where R' is lower-alkyl.

23. The process according to claim 22 where Ar is phenyl, R is hydrogen, and $R_1$ and $R_2$ are each lower-alkyl, which comprises reacting an aniline with a mixture of a tri-(lower-alkyl) orthoformate and an alkylidene malonate.

24. The process according to claim 22 where Ar is naphthyl, R is hydrogen, and $R_1$ and $R_2$ are each lower-alkyl, which comprises reacting a naphthylamine with a mixture of a tri-(lower-alkyl) orthoformate and an alkylidene malonate.

25. The process according to claim 22 where Ar is pyridyl, R is hydrogen, and $R_1$ and $R_2$ are each lower-alkyl, which comprises reacting an aminopyridine with a mixture of a tri-(lower-alkyl) orthoformate and an alkylidene malonate.

26. The process according to claim 22 where Ar is quinolyl, R is hydrogen, and $R_1$ and $R_2$ are each lower-alkyl, which comprises reacting an aminoquinoline with a mixture of a tri-(lower-alkyl) orthoformate and an alkylidene malonate.

27. The process according to claim 22 where Ar is pyrimidyl, R is hydrogen, and $R_1$ and $R_2$ are each lower-alkyl, which comprises reacting an aminopyrimidine with a mixture of a tri-(lower-alkyl) orthoformate and an alkylidene malonate.

28. The process according to claim 22 where Ar is 6-coumarinyl, R is hydrogen, $R_1$ and $R_2$ are each lower-alkyl, which comprises reacting a 6-aminocoumarin with a mixture of a tri-(lower-alkyl) orthoformate and an alkylidene malonate.

29. The process according to claim 22 where Ar is 2-pyrazinyl, R is hydrogen, and $R_1$ and $R_2$ are each lower-alkyl, which comprises reacting a 2-aminopyrazine with a mixture of a tri-(lower-alkyl) orthoformate and an alkylidene malonate.

30. The process which comprises heating a mixture containing an aniline, a trialkyl ortho ester of the formula $R_3C(OR')_3$ and an alkylidene (lower-alkyl)-malonate of the formula $R_4C(COO)_2CR_1R_2$ to form a 2-$R_3$-3-$R_4$-4-hydroxyquinoline where R', $R_1$ and $R_2$ are each lower-alkyl, $R_3$ is hydrogen or methyl, and $R_4$ is hydrogen or lower-alkyl.

31. The process according to claim 30 which comprises heating a mixture containing 4-chloroaniline, triethyl orthoformate and isopropylidene methylmalonate to form 6-chloro-4-hydroxy-3-methylquinoline.

32. The process according to claim 30 which comprises heating a mixture containing 4-chloroaniline, ethyl orthoacetate and isoproylidene malonate to form 6-chloro-4-hydroxy-2-methylquinoline.

33. The process according to claim 30 which comprises heating a mixture containing 4-chloroaniline, ethyl orthoformate and isopropylidene malonate to form 6-chloro-4-hydroxyquinoline.

34. Isopropylidene N - methylanilinomethylenemalonate according to claim 1 where Ar is phenyl, and R, $R_1$ and $R_2$ are each methyl.

References Cited

FOREIGN PATENTS 627,297  8/1949  Great Britain _____ 260—289

OTHER REFERENCES

Davidson et al., J. Am. Chem. Soc., vol. 70, pp. 3426–3428 (1949).

Adams et al., J. Am. Chem. Soc., vol. 74, pp. 5491–5497 (1952).

HENRY R. JILES, Primary Examiner

H. I. MOATZ, Assistant Examiner

U.S. Cl. X.R.

260—250, 251, 251.5, 256.4, 260, 288, 294.8, 296, 297, 289; 424—246, 250, 251, 256, 258, 263

UNITED STATES PATENT OFFICE
CERTIFICATE OF CORRECTION

Patent No. 3,563,981      Dated February 16, 1971

Inventor(s) George Y. Lesher

It is certified that error appears in the above-identified patent and that said Letters Patent are hereby corrected as shown below:

Column 1, line 57, after "lower-alkyl" insert a comma. Column 2, line 51, omit "com-"; Formula III, "$C(COC_2H_5)_2$" sho read -- $C(COOC_2H_5)_2$ --. Column 4, line 58, before "lower-" i -- ( --; line 72, between "-carbon" and "ortho" insert --atom Column 5, line 45, between "(" and "hydroxy-" insert -- 4- -- Column 6, Formula XI, insert "4" and "9" identifying the posi in their respective rings; line 16, "inhbition" should read --inhibition--; line 64, between "famate" and "sulfate" inser comma. Column 7, line 14, "of" (second occurrence) should re --or--; line 64, between " Ar' " and "phenylene" insert --is- Column 8, line 73, between "$C_{14}$" and "$H_{15}$" omit " - ". Colum line 37, between "$O_6$" and "(percent)" omit "P". Column 11, 1 7, "Foudn" should read --Found--; line 19, "absolate" should "absolute"; line 32, "methoxy 2" should read --methoxy-2--. Column 12, line 32, "methyleneamlonate" should read --methylenemalonate--. Column 13, line 1, "m-toluene" should read -- m-toluidene --; line 3, "p-tolenesulfonic" should rea -- p-toluenesulfonic --; line 67, "nitroqinoline" (second occurrence) should read --nitroquinoline--. Column 14, line "$No_4$" should read --$NO_4$--; line 16, after "hydroxyquinoline" insert a period; line 29, "ot" should read --to--; lines 39-4 between "4-" and "malonate" insert "chloroaniline, ethyl orthoacetate and isopropylidene"; line 66, "y." should read --g.--; line 74, "1809" should read --18.09--. Column 15, li 21. change the comma (first occurrence) to a colon; line 34, "215" should read --251--. Column 17, line 56, "ot" should read --to--. Column 19, line 23, "168.9" should read --168.0 Column 20, line 22, "methlyenemalonate" should read --methylenemalonate--. Column 23, line 22, "ispropylidene" should read --isopropylidene--. Column 24, line 59, "Dowther should read --Dowtherm--. Column 25, line 7, "abosolute" should read --absolute--. Column 31, line 1, between "heatin and "vacuo" insert --in--. Column 33, line 2, "4-unsubsti-" should read -- 4-(unsubsti- --; line 5, "3-unsubstituted-" should read -- 3-(unsubstituted- --; line 53, "isopropylidene

UNITED STATES PATENT OFFICE
CERTIFICATE OF CORRECTION

Patent No. 3,563,981     Dated February 16, 1971

Inventor(s) George Y. Lesher

It is certified that error appears in the above-identified patent and that said Letters Patent are hereby corrected as shown below:

should read -- isopropylidene 4 --. Column 34, between lines 58 and 59, insert "The following compounds are obtained by following the"; line 64, "(bis" should read -- )bis --. Column 35, line 14, "bis]" should read -- bis[ --; line 42, "napthylamine" should read --naphthylamine--. Column 36, line 1, "quinoyin" should read --quinolin--; line 53, "weighting" should read --weighing--. Column 37, lines 65-66, "and $R_3$ are each" should read --is--; line 66, "is" should read --and $R_2$ are each--. Column 38, lines 2-3, "and $R_3$ are each" should read --is--; line 18, omit "[$R_3C(OR')_3$]"; line 67, "$R_4C(COO)_2C$ should read --$R_4CH(COO)_2CR_1R_2$--. Column 39, line 2, "isoproylidene" should read --isopropylidene--.

Signed and sealed this 29th day of February 1972.

(SEAL)
Attest:

EDWARD M. FLETCHER, JR.
Attesting Officer

ROBERT GOTTSCHALK
Commissioner of Patents